US010865148B2

(12) United States Patent
Marlin et al.

(10) Patent No.: US 10,865,148 B2
(45) Date of Patent: Dec. 15, 2020

(54) PARTICULATE MATERIALS AND METHODS OF FORMING SAME

(71) Applicant: SAINT-GOBAIN CERAMICS & PLASTICS, INC., Worcester, MA (US)

(72) Inventors: Samuel S. Marlin, Plan d'Orgon (FR); David F. Louapre, Paris (FR); Jennifer H. Czerepinski, Framingham, MA (US); Lucie Fraichard, Boston, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 16/013,067

(22) Filed: Jun. 20, 2018

(65) Prior Publication Data
US 2018/0370857 A1 Dec. 27, 2018

Related U.S. Application Data

(60) Provisional application No. 62/522,800, filed on Jun. 21, 2017.

(51) Int. Cl.
*C09K 3/14* (2006.01)
*C04B 35/111* (2006.01)
(Continued)

(52) U.S. Cl.
CPC ...... *C04B 35/1115* (2013.01); *C04B 35/6263* (2013.01); *C04B 35/64* (2013.01); *C04B 2235/3213* (2013.01); *C04B 2235/3217* (2013.01); *C04B 2235/3229* (2013.01); *C04B 2235/5292* (2013.01);
(Continued)

(58) Field of Classification Search
CPC ............ C04B 35/1115; C04B 35/6263; C04B 2235/3213; C04B 2235/3217; C04B 2235/3229; C04B 2235/5292; C04B 2235/5296; C04B 2235/80; C04B 2235/95; C09K 3/14; C09K 3/1409
See application file for complete search history.

(56) References Cited

U.S. PATENT DOCUMENTS 345,604 A 7/1886 Semper
1,910,444 A 5/1933 Nicholson
(Continued)

FOREIGN PATENT DOCUMENTS

CA 743715 A 10/1966
CA 2423788 A1 7/2002
(Continued)

OTHER PUBLICATIONS

"Investigation of Shaped Abrasive Particles vol. 1: Review of U.S. Pat. No. 6,054,093 Apr. 25, 2000" © Apr. 2011, 5 pages.
(Continued)

*Primary Examiner* — Pegah Parvini
(74) *Attorney, Agent, or Firm* — Abel Schillinger, LLP; Adrian Lawrence

(57) ABSTRACT

A particulate material having a body including a first phase including alumina having an average crystallite size of not greater than 5 microns, and the body further including a second phase having a platelet shape.

20 Claims, 10 Drawing Sheets

(51) Int. Cl.
*C04B 35/64* (2006.01)
*C04B 35/626* (2006.01)

(52) U.S. Cl.
CPC .............. *C04B 2235/5296* (2013.01); *C04B 2235/6021* (2013.01); *C04B 2235/80* (2013.01); *C04B 2235/95* (2013.01)

(56) References Cited

U.S. PATENT DOCUMENTS

| | | |
|---|---|---|
| 2,036,903 A | 4/1936 | Webster |
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,808,747 A | 5/1974 | Kenagy |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A * | 2/1981 | Takahashi ............ C09K 3/1436 264/639 |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 7/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,457 A | 5/1990 | Dekok et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |

(56) References Cited

U.S. PATENT DOCUMENTS

| | | |
|---|---|---|
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,489,318 A | 2/1996 | Erickson et al. |
| 5,496,386 A | 3/1996 | Broberg et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,690,707 A | 11/1997 | Wood et al. |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,871,555 A | 2/1999 | Wood |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,980,678 A | 11/1999 | Tselesin |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,451,076 B1 | 9/2002 | Nevoret et al. |

(56) References Cited

U.S. PATENT DOCUMENTS

| | | |
|---|---|---|
| 6,475,253 B2 | 11/2002 | Culler et al. |
| 6,511,938 B1 | 1/2003 | Liu |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,750,173 B2 | 6/2004 | Rizkalla |
| 6,755,729 B2 | 6/2004 | Ramanath et al. |
| 6,802,878 B1 | 10/2004 | Monroe |
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,044,989 B2 | 5/2006 | Welygan et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,604 B2 | 9/2007 | Yoshizawa et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,867,302 B2 | 1/2011 | Nevoret et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,530,682 B2 | 9/2013 | Sachs |
| 8,628,597 B2 | 1/2014 | Palmgren et al. |
| 8,783,589 B2 | 7/2014 | Hart et al. |
| 8,852,643 B2 | 10/2014 | Gonzales et al. |
| 8,920,527 B2 | 12/2014 | Seider et al. |
| 8,921,687 B1 | 12/2014 | Welser et al. |
| 9,017,439 B2 | 4/2015 | Yener et al. |
| 9,079,154 B2 | 7/2015 | Rosendahl |
| 9,181,477 B2 | 11/2015 | Collins et al. |
| 9,259,726 B2 | 2/2016 | Gopal |
| 9,375,826 B2 | 6/2016 | Tian et al. |
| 9,758,724 B2 | 9/2017 | Collins et al. |
| D849,066 S | 5/2019 | Hanschen et al. |
| D849,067 S | 5/2019 | Hanschen et al. |
| D862,538 S | 10/2019 | Hanschen et al. |
| D870,782 S | 12/2019 | Hanschen et al. |
| 10,556,323 B2 | 2/2020 | Alkhas et al. |
| 10,557,068 B2 | 2/2020 | Oldenkotte et al. |
| 10,655,038 B2 | 5/2020 | Martinez et al. |
| 10,710,211 B2 | 7/2020 | Lehuu et al. |
| 10,717,908 B2 | 7/2020 | Hejtmann et al. |
| 2001/0027623 A1 | 10/2001 | Rosenflanz |
| 2002/0026752 A1 | 3/2002 | Culler et al. |
| 2002/0068518 A1 | 6/2002 | Cesena et al. |
| 2002/0084290 A1 | 7/2002 | Materna |
| 2002/0090891 A1 | 7/2002 | Adefris et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0098659 A1 | 5/2008 | Sung |
| 2008/0121124 A1 | 5/2008 | Sato |
| 2008/0172951 A1 | 7/2008 | Starling |

(56) References Cited

U.S. PATENT DOCUMENTS

| | | |
|---|---|---|
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0098365 A1 | 4/2009 | Moeltgen |
| 2009/0165394 A1 | 7/2009 | Culler et al. |
| 2009/0165661 A1 | 7/2009 | Koenig et al. |
| 2009/0169816 A1 | 7/2009 | Erickson et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1 | 1/2011 | Boylan |
| 2011/0081848 A1 | 4/2011 | Chen |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0152548 A1 | 6/2011 | Sachs |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2012/0308837 A1 | 12/2012 | Schlechtriemen et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0236725 A1 | 9/2013 | Yener et al. |
| 2013/0255162 A1 | 10/2013 | Welygan et al. |
| 2013/0267150 A1 | 10/2013 | Seider et al. |
| 2013/0283705 A1 | 10/2013 | Fischer et al. |
| 2013/0296587 A1 | 11/2013 | Rosendahl |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0107356 A1 | 4/2014 | Gopal |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0256238 A1 | 9/2014 | Van et al. |
| 2014/0287658 A1 | 9/2014 | Flaschberger et al. |
| 2014/0290147 A1 | 10/2014 | Seth et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0209932 A1 | 7/2015 | Lehuu et al. |
| 2015/0218430 A1 | 8/2015 | Yener et al. |
| 2015/0232727 A1 | 8/2015 | Erickson |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186027 A1* | 6/2016 | Sarangi .............. C09K 3/1436 51/295 |
| 2016/0186028 A1 | 6/2016 | Louapare et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |
| 2017/0066099 A1 | 3/2017 | Nakamura |
| 2017/0114260 A1 | 4/2017 | Bock et al. |
| 2017/0129075 A1 | 5/2017 | Thurber et al. |
| 2017/0225299 A1 | 8/2017 | Keipert et al. |
| 2017/0349797 A1 | 12/2017 | Yener et al. |
| 2018/0086957 A1 | 3/2018 | Sahlin et al. |
| 2018/0161960 A1 | 6/2018 | Wilson et al. |
| 2018/0169837 A1 | 6/2018 | Liu |
| 2018/0215975 A1 | 8/2018 | Marazano et al. |
| 2018/0215976 A1 | 8/2018 | Cotter et al. |
| 2018/0318983 A1 | 11/2018 | Wilson et al. |
| 2019/0022826 A1 | 1/2019 | Franke et al. |
| 2019/0030684 A1 | 1/2019 | Van et al. |
| 2019/0091835 A1 | 3/2019 | Culler et al. |
| 2019/0126436 A1 | 5/2019 | Westberg et al. |
| 2019/0217442 A1 | 7/2019 | Gaeta et al. |
| 2019/0249052 A1 | 8/2019 | Eckel et al. |
| 2019/0270182 A1 | 9/2019 | Eckel et al. |
| 2019/0322915 A1 | 10/2019 | Jiwpanich et al. |
| 2019/0330505 A1 | 10/2019 | Bujnowski et al. |
| 2019/0337124 A1 | 11/2019 | Liu et al. |
| 2019/0338172 A1 | 11/2019 | Erickson et al. |
| 2019/0338173 A1 | 11/2019 | Yener et al. |
| 2019/0351531 A1 | 11/2019 | Nelson et al. |
| 2019/0366511 A1 | 12/2019 | Huber |
| 2019/0382637 A1 | 12/2019 | Braun et al. |
| 2020/0139512 A1 | 5/2020 | Culler et al. |
| 2020/0148927 A1 | 5/2020 | Arcona et al. |
| 2020/0156215 A1 | 5/2020 | Jusuf et al. |

(56) References Cited

U.S. PATENT DOCUMENTS

| | | | |
|---|---|---|---|
| 2020/0157396 A1 | 5/2020 | Cotter et al. | |
| 2020/0157397 A1 | 5/2020 | Stevenson et al. | |
| 2020/0199426 A1 | 6/2020 | Yener et al. | |

FOREIGN PATENT DOCUMENTS

| | | |
|---|---|---|
| CH | 685051 A5 | 3/1995 |
| CN | 102281992 A | 12/2011 |
| CN | 103189164 A | 7/2013 |
| CN | 102123837 B | 7/2014 |
| CN | 104125875 A | 10/2014 |
| CN | 104994995 A | 10/2015 |
| CN | 105713568 A | 6/2016 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B3 | 7/2001 |
| EP | 0833803 | 8/2001 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2242618 A2 | 10/2010 |
| EP | 2390056 A2 | 11/2011 |
| EP | 1800801 B1 | 3/2012 |
| EP | 2445982 A2 | 5/2012 |
| EP | 2507016 A2 | 10/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| EP | 3342839 A1 | 7/2015 |
| EP | 3319758 A1 | 5/2018 |
| EP | 3342839 A1 | 7/2018 |
| EP | 3444313 B1 | 7/2020 |
| FR | 2354373 A1 | 1/1978 |
| GB | 986847 A | 3/1965 |
| GB | 1466054 | 3/1977 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 2000354967 A | 12/2000 |
| JP | 3160084 B2 | 4/2001 |
| JP | 2001162541 A | 6/2001 |
| JP | 03194269 B2 | 7/2001 |
| JP | 2001180930 A | 7/2001 |
| JP | 2001207160 A | 7/2001 |
| JP | 2002-038131 A | 2/2002 |
| JP | 2002210659 A | 7/2002 |
| JP | 2003-049158 A | 2/2003 |
| JP | 2004-510873 A | 4/2004 |
| JP | 2004209624 A | 7/2004 |
| JP | 2006130586 A | 5/2006 |
| JP | 2006130636 A | 5/2006 |
| JP | 2006159402 A | 6/2006 |
| JP | 2006-192540 A | 7/2006 |
| JP | 2008132560 A | 6/2008 |
| JP | 2008194761 A | 8/2008 |
| JP | 2008531305 A | 8/2008 |
| JP | 2012512046 A | 5/2012 |
| JP | 2012512047 A | 5/2012 |
| JP | 2012512048 A | 5/2012 |
| JP | 2012530615 A | 12/2012 |
| JP | 5238725 B2 | 7/2013 |
| JP | 5238726 B2 | 7/2013 |
| JP | 2014503367 A | 2/2014 |
| JP | 2017518889 A | 7/2017 |
| JP | 2017538588 A | 12/2017 |
| JP | 2018510073 A | 4/2018 |
| NL | 171464 B | 11/1982 |
| WO | 1994002559 A1 | 2/1994 |
| WO | 95/03370 | 2/1995 |
| WO | 95/18192 A1 | 7/1995 |
| WO | 1995020469 A1 | 8/1995 |
| WO | 96/27189 A1 | 9/1996 |
| WO | 9711484 A1 | 3/1997 |
| WO | 1997014536 A1 | 4/1997 |
| WO | 97/20011 | 6/1997 |
| WO | 1997/020011 A1 | 6/1997 |
| WO | 9720011 A1 | 6/1997 |
| WO | 1999006500 A1 | 2/1999 |
| WO | 99/38817 A1 | 8/1999 |
| WO | 1999038817 A1 | 8/1999 |
| WO | 9954424 A1 | 10/1999 |
| WO | 01/14494 A1 | 3/2001 |
| WO | 0123323 A1 | 4/2001 |
| WO | 2002097150 | 12/2002 |
| WO | 03/087236 A1 | 10/2003 |
| WO | 2005/080624 A1 | 9/2005 |
| WO | 2006/027593 | 3/2006 |
| WO | 2007/041538 A1 | 4/2007 |
| WO | 2009085578 A2 | 7/2009 |
| WO | 2010/077509 A1 | 7/2010 |
| WO | 2010085587 A1 | 7/2010 |
| WO | 2010/151201 | 12/2010 |

(56) References Cited

FOREIGN PATENT DOCUMENTS

| | | |
|---|---|---|
| WO | 2011005425 A2 | 1/2011 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2010070294 A1 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013040423 A2 | 3/2013 |
| WO | 2013/045251 A1 | 4/2013 |
| WO | 2013/049239 A1 | 4/2013 |
| WO | 2013070576 A2 | 5/2013 |
| WO | 2013/101575 A1 | 7/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013/177446 A1 | 11/2013 |
| WO | 2013/186146 A1 | 12/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/048768 A9 | 6/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/102992 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/160854 A1 | 10/2015 |
| WO | 2015/160855 A1 | 10/2015 |
| WO | 2015/160857 A1 | 10/2015 |
| WO | 2015/164211 A1 | 10/2015 |
| WO | 2015/165122 A1 | 11/2015 |
| WO | 2015/167910 A1 | 11/2015 |
| WO | 2015/179335 A1 | 11/2015 |
| WO | 2015/180005 A1 | 12/2015 |
| WO | 2015/184355 A1 | 12/2015 |
| WO | 2016/028683 A1 | 2/2016 |
| WO | 2016/044158 A1 | 3/2016 |
| WO | 2016/064726 A1 | 4/2016 |
| WO | 2016/089675 A1 | 6/2016 |
| WO | 2016/105469 A1 | 6/2016 |
| WO | 2016/105474 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |
| WO | 2016/187570 A1 | 11/2016 |
| WO | 2016/196795 A1 | 12/2016 |
| WO | 2016/201104 A1 | 12/2016 |
| WO | 2016/205133 A1 | 12/2016 |
| WO | 2016/205267 A1 | 12/2016 |
| WO | 2016/210057 A1 | 12/2016 |
| WO | 2017/007703 A1 | 1/2017 |
| WO | 2017/007714 A1 | 1/2017 |
| WO | 2017/062482 A1 | 4/2017 |
| WO | 2017/083249 A1 | 5/2017 |
| WO | 2017/083255 A1 | 5/2017 |
| WO | 2016/105543 A9 | 9/2017 |
| WO | 2017/151498 A1 | 9/2017 |
| WO | 2018/010730 A1 | 1/2018 |
| WO | 2018/026669 A1 | 2/2018 |
| WO | 2018/057465 A1 | 3/2018 |
| WO | 2018/057558 A1 | 3/2018 |
| WO | 2018/063902 A1 | 4/2018 |
| WO | 2018/063958 A1 | 4/2018 |
| WO | 2018/063960 A1 | 4/2018 |
| WO | 2018/063962 A1 | 4/2018 |
| WO | 2018/064642 A1 | 4/2018 |
| WO | 2018/080703 A1 | 5/2018 |
| WO | 2018/080704 A1 | 5/2018 |
| WO | 2018/080705 A1 | 5/2018 |
| WO | 2018/080755 A1 | 5/2018 |
| WO | 2018/080756 A1 | 5/2018 |
| WO | 2018/080765 A1 | 5/2018 |
| WO | 2018/080778 A1 | 5/2018 |
| WO | 2018/080784 A1 | 5/2018 |
| WO | 2018/081246 A1 | 5/2018 |
| WO | 2018/118688 A1 | 6/2018 |
| WO | 2018/118690 A1 | 6/2018 |
| WO | 2018/118695 A1 | 6/2018 |
| WO | 2018/118699 A1 | 6/2018 |
| WO | 2018/134732 A1 | 7/2018 |
| WO | 2018/136268 A1 | 7/2018 |
| WO | 2018/136269 A1 | 7/2018 |
| WO | 2018/136271 A1 | 7/2018 |
| WO | 2018/207145 A1 | 11/2018 |
| WO | 2018207145 A1 | 11/2018 |
| WO | 2019001908 A1 | 1/2019 |
| WO | 2019069157 A1 | 4/2019 |
| WO | 2019102312 A1 | 5/2019 |
| WO | 2019102328 A1 | 5/2019 |
| WO | 2019102329 A1 | 5/2019 |
| WO | 2019102330 A1 | 5/2019 |
| WO | 2019102331 A1 | 5/2019 |
| WO | 2019167022 A1 | 9/2019 |
| WO | 2019197948 A1 | 10/2019 |
| WO | 2019207415 A1 | 10/2019 |
| WO | 2019207416 A1 | 10/2019 |
| WO | 2019207417 A1 | 10/2019 |
| WO | 2019207423 A1 | 10/2019 |
| WO | 2019215571 A1 | 11/2019 |
| WO | 2020035764 A1 | 2/2020 |
| WO | 2020075005 A1 | 4/2020 |
| WO | 2020079522 A1 | 4/2020 |
| WO | 2020084382 A1 | 4/2020 |
| WO | 2020084483 A1 | 4/2020 |
| WO | 2020089741 A1 | 5/2020 |
| WO | 2020128794 A1 | 6/2020 |

(56) References Cited

FOREIGN PATENT DOCUMENTS

OTHER PUBLICATIONS

Austin, Benson M., "Thick-Film Screen Printing," Solid State Technology, Jun. 1969, pp. 53-58.
Avril, Nicholas Joseph, "Manufacturing Glass-fiber Reinforcement for Grinding Wheels," Massachusetts Institute of Technology, 1996, 105 pgs.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., Journal of Materials Research, 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, 1 page.
Wu, J. et al., Friction and Wear Properties of Kevlar Pulp Reinforced Epoxy.
J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
Winter Catalogue No. 5, Dressing tools, WINTER diamond tools for dressing grinding wheels, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com, May 2014, pp. 36-44.
DOW Machine Tool Accessories, Grinding & Surface Finishing, www.1mta.com, Nov. 2014, 72 pages.
Kumar et al., "Composites by rapid prototyping technology", Material & Design, Feb. 2010, vol. 31, Issue 2, pp. 850-856.
Lewis et al., "Direct Ink Writing of Three-Dimensional Ceramic Structures", Journal of the American Ceramic Society, US, Nov. 30, 2006, vol. 89, Issue 12, pp. 3599-3609.
International Search Report and Written Opinion for Application No. PCT/US2016/036701, dated Sep. 1, 2016, 12 pages.

\* cited by examiner

PARTICULATE MATERIALS AND METHODS OF FORMING SAME

CROSS-REFERENCE TO RELATED APPLICATION

This application claims priority under 35 U.S.C. § 119(e) to U.S. Patent Application No. 62/522,800 entitled "Particulate Materials and Methods of Forming Same," by Samuel S. MARLIN, et al., filed Jun. 21, 2017, which is assigned to the current assignee hereof and incorporated herein by reference in its entirety.

BACKGROUND

Field of the Disclosure

The following is directed to particulate materials, such as, particulate materials including a first phase and a second phase, and methods of forming such particulate materials.

Description of the Related Art

Abrasive particles and abrasive articles made from abrasive particles are useful for various material removal operations including grinding, finishing, and polishing. Depending upon the type of abrasive material, such abrasive particles can be useful in shaping or grinding a wide variety of materials and surfaces in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Three basic technologies that have been employed to produce abrasive particles having a specified shape are (1) fusion, (2) sintering, and (3) chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660, disclosing a process comprising the steps of flowing molten abrasive material from a furnace onto a cool rotating casting cylinder, rapidly solidifying the material to form a thin semisolid curved sheet, densifying the semisolid material with a pressure roll, and then partially fracturing the strip of semisolid material by reversing its curvature by pulling it away from the cylinder with a rapidly driven cooled conveyor.

In the sintering process, abrasive particles can be formed from refractory powders having a particle size of up to 10 micrometers in diameter. Binders can be added to the powders along with a lubricant and a suitable solvent, e.g., water. The resulting mixtures, mixtures, or slurries can be shaped into platelets or rods of various lengths and diameters. See, for example, U.S. Pat. No. 3,079,242, which discloses a method of making abrasive particles from calcined bauxite material comprising the steps of (1) reducing the material to a fine powder, (2) compacting under affirmative pressure and forming the fine particles of said powder into grain sized agglomerations, and (3) sintering the agglomerations of particles at a temperature below the fusion temperature of the bauxite to induce limited recrystallization of the particles, whereby abrasive grains are produced directly to size.

Chemical ceramic technology involves converting a colloidal dispersion or hydrosol (sometimes called a sol), optionally in a mixture, with solutions of other metal oxide precursors, to a gel or any other physical state that restrains the mobility of the components, drying, and firing to obtain a ceramic material. See, for example, U.S. Pat. Nos. 4,744,802 and 4,848,041.

Still, there remains a need in the industry for improving performance, life, and efficacy of abrasive particles, and the abrasive articles that employ abrasive particles.

SUMMARY

According to one aspect, a particulate material includes a body including a first phase including alumina having an average crystallite size of not greater than 5 microns, and wherein the body further comprises a second phase having a platelet shape.

In another aspect, a particulate material includes a body having a first phase including alumina and a second phase having a platelet shape, wherein the second phase comprises Sr in a range of at least 0.2 wt % and not greater than 5 wt % for a total weight of the body.

According to another aspect, a particulate material includes a body having a first phase including alumina and a second phase having a platelet shape and containing Sr and Ce, wherein the second phase comprises a Sr content within a range of at least 0.2 wt % and not greater than 5 wt % for a total weight of the body, and wherein the second phase comprises a Ce content within a range of at least 0.05 wt % and not greater than 2 wt % for a total weight of the body.

In yet another aspect, a particulate material includes a body having a first phase including alumina and a second phase having a platelet shape and containing Sr and Ce, wherein the second phase comprises Sr and Ce, and wherein the second phase comprises a ratio of Sr:Ce within a range of at least 1:1 to not greater than 100:1.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is directed to methods of forming a particulate material having certain compositions, including a particulate material in the form of abrasive particles, shaped abrasive particles, and the like. The particulate material may be used in various articles, such as abrasive articles, and more particularly, fixed abrasives, such as bonded abrasive articles, coated abrasive articles, non-woven abrasive articles and the like. Still, in other instances, the particulate material may be used as a free abrasive material, wherein the particulate material is not necessarily attached to a substrate or incorporated into a matrix material.

Figure 1:
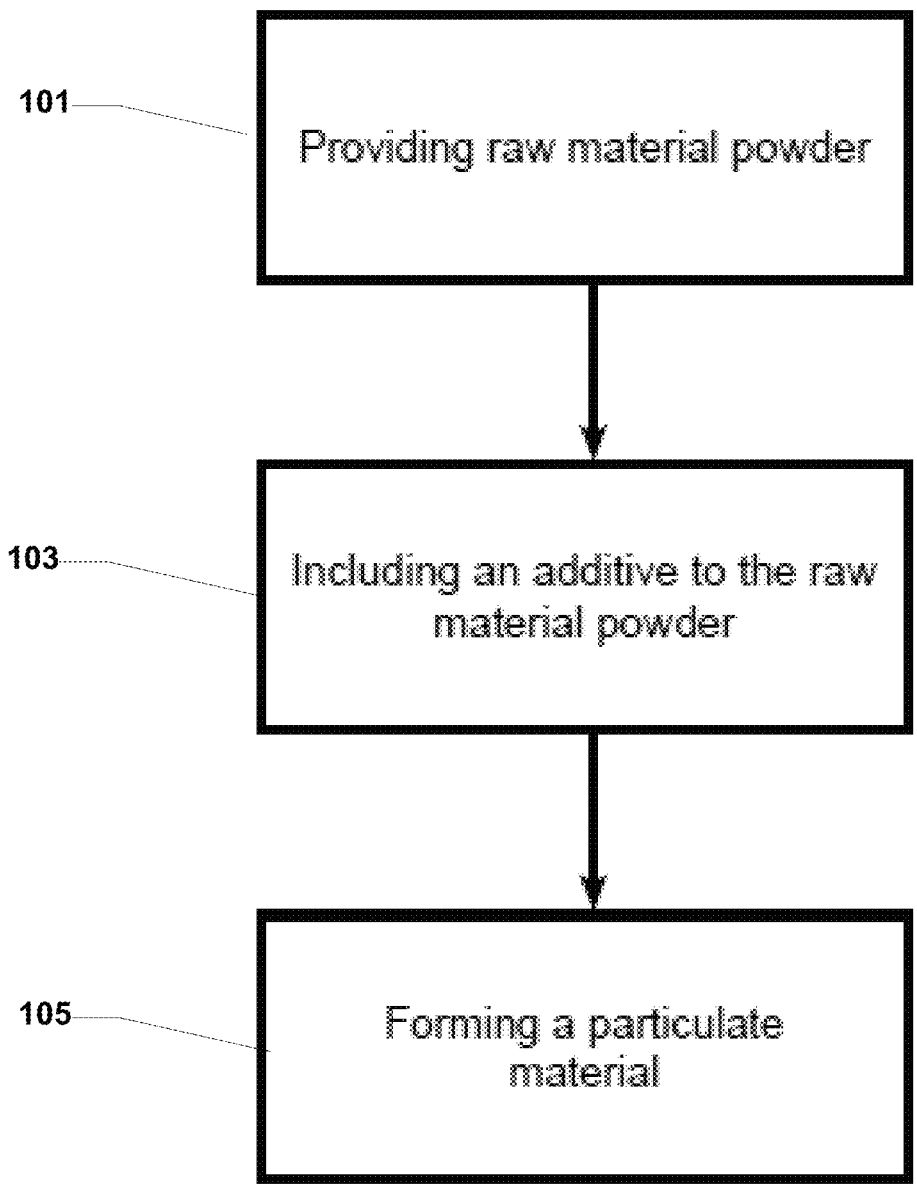
FIG. 1 includes a flowchart illustrating a process of forming a particulate material in accordance with an embodiment.

FIG. 1 includes a flowchart illustrating a process of forming a particulate material in accordance with an embodiment. As illustrated, the process can be initiated at step 101, by providing a raw material powder. In at least one embodiment, the raw material powder can be a material selected from the group of oxides, carbides, nitrides, borides, oxycarbides, oxynitrides, oxyborides, and combination thereof. In certain instances, the raw material powder may include an oxide. Furthermore, the raw material powder may include alumina, and may consist essentially of alumina. In one embodiment, the raw material powder may include a hydrated alumina, such as boehmite. In another embodiment, the raw material powder may include alpha alumina.

As noted herein, the raw material powder can included a seeded material, such as material processed through a seeded processing pathway. That is, for example, the raw material may be include a seed material, which may be a compound, complex, or element configured to control the growth of particular crystalline phases within the raw material powder. The seeded raw material powder may include a minority content of seed material, which may facilitate the formation of particular crystalline phases during further processing of the raw material powder. One non-limiting seeded processing pathway is described herein. In other instances, the raw material powder may include an unseeded material, and can be essentially free of seed material.

Providing a raw material powder can include synthesis of a particulate material by obtaining an aluminous raw material. While certain aluminous raw materials can be sourced commercially, in other instances, the aluminous raw material may be manufactured. In accordance with an embodiment, the process of forming the raw material powder can include processes such as, dispersing, mixing, gelling, seeding, calcining, shaping, printing, molding, extruding, pressing, drying, crushing, sieving, sorting, and a combination thereof.

As noted herein, the raw material powder may be obtained by manufacturing an aluminous raw material according to a seeded pathway. In one embodiment, the aluminous raw material can include a boehmite precursor and boehmite seeds in a suspension (alternatively sol or slurry), that can be heat-treated (such as by hydrothermal treatment) to convert the boehmite precursor into boehmite particulate material formed of particles or crystallites. The term "boehmite" is generally used herein to denote alumina hydrates including mineral boehmite, typically being Al2O3.H2O and having a water content on the order of 15%, as well as pseudoboehmite, having a water content higher than 15%, such as 20-38% by weight. It is noted that boehmite (including pseudoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used for the fabrication of boehmite particulate materials.

After forming suitable boehmite particulate material, a heat treatment process can be carried out to effect polymorphic transformation, which removes water and forms an alumina material. According to one aspect, the boehmite particulate material can have a relatively elongated morphology, and such morphology of the boehmite may be largely preserved in the particulate material.

Primary aspect ratio is defined as the ratio of the longest dimension to the next longest dimension (i.e., width) perpendicular to the longest dimension but in the same plane as the longest dimension and is generally not less than 2:1. Such particles may be referred to as needle-like or needle-shaped particles, particularly when the thickness of the particles (a dimension perpendicular to the length and extending out of the plane of the length and width) is less than the length of the particles.

Alternatively, the boehmite particulate material can have a platy or platelet-shaped contour, generally have an elongated structure having the primary aspect ratios described above in connection with the needle-shaped particles. However, platelet-shaped particles generally have opposite major surfaces, the opposite major surfaces being generally planar and generally parallel to each other.

The morphology of the boehmite particulate material formed through a seeding process can have a relatively fine particle or crystallite size. Generally, the average boehmite material particle size is not greater than about 1000 nanometers, such as within a range of at least 100 to not greater than 1000 nanometers. Other embodiments have even finer average particle sizes, such as not greater than about 800 nanometers or not greater than 750 nanometers or not greater than 600 nanometers or not greater than 500 nanometers or not greater than 400 nanometers or even not greater than 300 nanometers. As used herein, the "average particle size" in connection with high aspect ratio boehmite particulate material is used to denote the average longest or length dimension of the particles.

In addition to aspect ratio and average particle size of the boehmite particulate material, morphology of the boehmite particulate material may be further characterized in terms of specific surface area. Here, the commonly available BET technique was utilized to measure specific surface area of the boehmite particulate material. According to embodiments herein, the boehmite particulate material may have a relatively high specific surface area, such as not less than about 10 $m^2/g$, such as not less than about 50 $m^2/g$ or not less than 70 $m^2/g$ or even not less than about 90 $m^2/g$. In a non-limiting embodiment, the specific surface area of the boehmite particulate material can be not greater than about 400 $m^2/g$, such as not greater than 350 $m^2/g$ or even not greater than 300 $m^2/g$. The specific surface area can be within a range including any of the minimum and maximum values noted above.

Turning to the details of the processes by which the seeded boehmite particulate material may be manufactured, generally ellipsoid, needle, or platelet-shaped boehmite is formed from a boehmite precursor, typically an aluminous material including bauxitic minerals, by hydrothermal treatment as generally described in the commonly owned patent described above, U.S. Pat. No. 4,797,139. More specifically, the boehmite particulate material may be formed by combining the boehmite precursor and boehmite seeds in suspension, exposing the suspension (alternatively sol or slurry) to heat treatment to cause conversion of the raw material into boehmite particulate material, further influenced by the boehmite seeds provided in suspension. Heating may be conducted in an autogenous environment, such that an elevated pressure is generated during processing. The pH of the suspension is generally selected from a value of less than 7 or greater than 8, and the boehmite seed material can have a particle size finer than about 0.5 microns. Generally, the seed particles are present in an amount greater than about 1% by weight of the boehmite precursor (calculated as $Al_2O_3$), and heating is carried out at a temperature greater than about 120° C., such as greater than about 125° C., or even greater than about 130° C., and at a pressure that is autogenously generated, typically around 30 psi.

Following heat treatment, such as by hydrothermal treatment, the liquid content is generally removed, such as through an ultrafiltration process or by heat treatment to evaporate the remaining liquid. Thereafter, the resulting mass is generally crushed to a particular average particle size. It is noted that the particulate size described herein generally describes the individual particles formed through processing, rather than the aggregates which may remain in certain embodiments (e.g., for those products that call for an aggregated material).

Certain processing variables may be modified during the formation of the boehmite particulate material, to affect the desired morphology. These variables include the ratio of boehmite precursor to boehmite seed, the particular type or species of acid or base used during processing (as well as the relative pH level), and the temperature (which is directly proportional to pressure in an autogenous hydrothermal environment) of the system.

Suitable acids and bases include mineral acids such as nitric acid, organic acids such as formic acid, halogen acids such as hydrochloric acid, and acidic salts such as aluminum nitrate and magnesium sulfate. Effective bases include, for example, amines including ammonia, alkali hydroxides such as potassium hydroxide, alkaline hydroxides such as calcium hydroxide, and basic salts.

After forming the boehmite particulate material, which can be the raw material powder used in later processes according to embodiments herein, the process can further include heat-treatment of the boehmite particulate material to form an aluminous material. In accordance with a particular embodiment, the heat-treatment can include calcination of the boehmite particulate material at a temperature sufficient to cause transformation into a particular phase of alumina (e.g., gamma, delta, theta, alpha) or combination of phases of alumina providing a suitable aluminous material. For purposes of clarification, an aluminous material is one that comprises a majority content (wt %) of alumina ($Al_2O_3$) and preferably, at least about 80 wt %, at least 90 wt %, at least 95 wt % or even consisting essentially of alumina. Still, the boehmite particulate material may be used for other processes before heat-treatment, including for example the provision of an additive, which is described in more detail herein.

Referring again to FIG. 1, after step 101 and providing a raw material, the process can continue at step 103 by including an additive to the raw material powder. In accordance with an embodiment, the process of including an additive can include an impregnation process, which may include providing the additive into pores of the raw material powder. The porosity of the raw material powder may be obtained through natural or artificial processes. For example, the raw material powder may first be processed through other techniques, such as calcining to facilitate the formation of a porous raw material powder, and thereafter, the additive may be added to the raw material powder to facilitate impregnation. Still, as will be described herein, one or more processes may be utilized before or after calcination to facilitate inclusion of an additive.

The process of calcination can include heating the raw material powder to a temperature suitable to remove particular volatile components and facilitate the formation of a porous raw material. In one particular instance, the process of calcining can be conducted at a temperature of at least about 300° C. In other instances, the calcining temperature may be greater, such as at least about 600° C., at least about 700° C., or even at least about 750° C. Still, the process of calcining may be conducted at a temperature not greater than about 1200° C., such as not greater than about 1000° C. or even not greater than about 900° C. It will be appreciated that the process of calcining can be conducted at a temperature within a range between any of the minimum and maximum values noted above.

In certain instances, the process of impregnating can include saturation of the porosity of the raw material powder with the additive. Saturation can include filling at least a portion of the pore volume of the raw material powder with the additive. Still, a saturation process may include filling a majority of the porosity with the additive, and more particularly, may include filling substantially all of the total pore volume of the raw material powder with the additive. The saturation process, which may further include an oversaturation process, can utilize processes including, but not limited to, soaking, mixing, stirring, increased pressure above atmospheric conditions, decreased pressure below atmospheric conditions, particular atmospheric conditions (e.g., inert atmosphere, reducing atmosphere, oxidizing atmosphere), heating, cooling, and a combination thereof. In at least one particular embodiment, the process of including can include soaking the raw material powder in a solution containing the additive.

In certain instances, the additive can include one or more components. For example, the additive may include a first component and a second component distinct from the first component. In accordance with an embodiment, the first component may include strontium. According to certain embodiments, the first component may include a salt, and may be present as a solution including the at least one element. For example, the first component may include a nitrate salt solution. In one particular embodiment, the additive can include strontium nitrate, which may be added in the form of a solution.

In certain instances, the additive may include a second component, which can be distinct from the first component. For example, the second component may include an element such as cerium. In addition, the second component may be present as a compound including cerium. According to a particular embodiment, the second component can include cerium, and more particularly, may include a salt compound including cerium, such as cerium nitrate, which may be added in the form of a solution.

The process of including the additive can include particular combinations of the first component and the second component into the raw material powder. For example, in one embodiment, the process of including the additive can include providing the first component at a first time and the second component at a second time. The first time and second time may be the same as each other, such that the first component and second component can be added to the raw material powder simultaneously. Still, in another embodiment, the first component and second component can be added to the raw material powder at different times. For example, the first component may be added before the second component. Alternatively, the first component may be added after the second component.

The process of including an additive can include performing at least one process between the addition of the first component and the addition of the second component to the raw material powder. For example, some exemplary processes that may be conducted between the addition of the first component and the second component can include mixing, drying, heating, calcining and a combination thereof. In one particular embodiment, the process of including the additive may include providing the first component to the raw material powder, heating the raw material powder after the addition of the first component to the raw material powder, and providing the second component to the raw material powder and first component after heating the raw material and first component. It will be appreciated that such a heating process may include a calcining process.

According to alternative embodiment, the process of including an additive can include a process of doping. Doping can include a process wherein the additive is combined with the raw material powder prior to conducting certain processes, particularly calcination of the raw material powder. The doping process may also utilize an additive including a first component and a second component, according to embodiments herein. In particular, the first component and second component may both be added to the raw material powder prior to a calcination process.

Referring again to FIG. 1, after completing the process of including an additive to the raw material powder at step 103, the process can continue at step 105 by forming a particulate material. The particulate material may include a body having a first phase and second phase, which is distinct from the first phase and includes at least one element of the additive, including for example, strontium (Sr), cerium (Ce), or any combination thereof.

The process of forming can include combining the first component and second component of the additive as precursors to form the second phase within the particulate material. In at least one embodiment, the process of forming can include combining the first and second components to form a second phase in the body of the particulate material. The process of forming may also include converting the precursor material of the additives into the second phase. For example, the first and second components may be added to the mixture as precursors (e.g., salts including the desired elements). In one embodiment, the process of converting the precursor into the second phase can include the application or alteration of at least one of temperature, pressure, atmosphere, or any combination thereof. Converting the precursor to a second phase can include volatilization of certain species, including for example, water. Moreover, the process of converting can include crystallization or a change in crystalline structure of the precursor of the second phase. In still another embodiment, the process of converting can include densification.

According to a particular embodiment, the process of converting the precursor to the second phase can include firing the raw material and precursor of the second phase. The firing process may include a sintering process, including densification of the material and formation of high temperature phases of the first phase, including for example, alpha alumina. Firing may be conducted at a temperature of at least 800° C., such as at least 1000° C. or at least 1200° C. or even at least 1400° C. Still, firing may be conducted at a temperature that is not greater than 1700° C., such as not greater than 1600° C. or even not greater than 1500° C. It will be appreciated that firing may be conducted at a temperature within a range between any of the above minimum and maximum temperatures. Firing may also include sintering, which includes densification of the body.

Furthermore, it will be appreciated that firing may be conducted for a particular time and under a particular atmosphere. For example, firing may be conducted for at least about 1 minute at ambient conditions, or even at least about 4 minutes, at least about one hour, such as at least about two hours, or even at least about three hours. Furthermore, the atmosphere utilized during firing may include an oxidizing atmosphere, a reducing atmosphere, or an inert atmosphere.

In accordance with an embodiment, after conducting the forming process, the particulate material can have a density of at least about 95% theoretical density. In other instances, the particulate material may have a greater density, such as at least about 96% or even at least about 97% or at least 98% or at least 99% or at least 99.5% or at least 99.9% theoretical density.

After conducting the forming process the particulate material may have a specific surface area, such as not greater than about 100 $m^2/g$. In still other embodiments, the specific surface area of the particulate material maybe not greater than about 90 $m^2/g$, such as not greater than 80 $m^2/g$, or even not greater than about 10 $m^2/g$, or even not greater than about 1 $m^2/g$. Still, the specific surface area of the particulate material may be at least about 0.01 $m^2/g$, or even at least about 0.05 $m^2/g$. It will be appreciated that the specific surface area of the particulate material maybe be within a range between any of the above minimum and maximum values.

In yet another embodiment, the particulate material can have a body having an average particle size, which may be selected from a group of predetermined sieve sizes. For example, the body can have an average particle size of not greater than about 5 mm, such as not greater than about 3 mm, not greater than about 2 mm, not gather than about 1 mm, or even not greater than about 0.8 mm Still, in another embodiment, the body may have an average particle size of at least about 0.1 µm. It will be appreciated that the body may have an average particle size within a range between any of the minimum and maximum values noted above.

Particles for use in the abrasives industry are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards. ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS 16, JIS24, JIS36, JIS46, JIS54, JIS60, JIS80, JIS 100, JIS150, JIS180, JIS220, JIS240, JIS280, JIS320, JIS360, JIS400, JIS600, JIS800, JIS 1000, JIS 1500, JIS2500, JIS4000, JIS6000, JIS8000, and JIS10,000. Alternatively, the shaped abrasive particles 20 can graded to a nominal screened grade using U.S.A. Standard Test Sieves conforming to ASTM E-1 1 "Standard Specification for Wire Cloth and Sieves for Testing Purposes." ASTM E-1 1 prescribes the requirements for the design and construction of testing sieves using a medium of woven wire cloth mounted in a frame for the classification of materials according to a designated particle size. A typical designation may be represented as −18+20 meaning that the particles pass through a test sieve meeting ASTM E-1 1 specifications for the number 18 sieve and are retained on a test sieve meeting ASTM E-1 1 specifications for the number 20 sieve. In various embodiments, the particulate material can have a nominal screened grade comprising: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size could be used such as −90+100. The body of the particulate material may be in the form of a shaped abrasive particle, as described in more detail herein.

In accordance with one aspect, the particulate material can have a body including a first phase and a second phase, wherein the second phase can have a platelet shape. The second phase can be distributed throughout the first phase. Further details on the morphology and chemistry of the particulate material is provided in the embodiments below.

According to one embodiment, the first phase may include alumina, such as alpha alumina. The first phase may be primarily alpha alumina, and more particularly, may consist essentially of alpha alumina. In certain instances, the body may be formed such that it is not greater than about 1 wt % of low-temperature alumina phases for the total weight of the body. As used herein, low temperature alumina phases can include transition phase aluminas, bauxites or hydrated alumina, including for example gibbsite, boehmite, diaspore, and mixtures containing such compounds and minerals. Certain low temperature alumina materials may also include some content of iron oxide. Moreover, low temperature alumina phases may include other minerals, such as goethite, hematite, kaolinite, and anastase. In particular instances, the particulate material can consist essentially of alpha alumina as the first phase and may be essentially free of low temperature alumina phases.

Furthermore, the particulate material may be formed such that the body includes not greater than about 1 wt % of impurity elements for the total weight of the body. Some exemplary impurity elements can include transition metal elements, alkaline earth elements, alkaline elements, and a combination thereof. In one particular instance, the body can include a limited amount of water, such as a content within the body of not greater than about 1 wt % water for the total weight of the body. Moreover, the body can be essentially free of water.

In one aspect, the particulate material may have a body including a first phase having at least about 51 wt % alumina for a total weight of the first phase. For other embodiments, the body can include at least about 60 wt % alumina for the total weight of the first phase, such as least about 70 wt % or at least about 80 wt % or at least about 83 wt % or at least about 85 wt % or at least about 90 wt % or at least about 93 wt %, at least about 95 wt % or at least 97 wt % alumina for the total weight of the body. In at least one embodiment, the first phase consists essentially of alumina. For yet another embodiment, the body may include a seeded alumina material, and the first phase may include alpha alumina formed from the seeded alumina material.

In another embodiment, the body can include a particular content of alumina, which may facilitate particulate material having improved properties. For example, the body can include at least 51 wt % alumina for the total weight of the body, such as at least 60 wt % alumina or at least 70 wt % alumina or at least 80 wt % alumina or at least 90 wt % alumina or at least 95 wt % alumina or at least 97 wt % alumina. Still, in another non-limiting embodiment, the body may include not greater than 99.9 wt % alumina for the total weight of the body, such as not greater than 99.5% alumina or not greater than 99 wt % alumina or not greater than 98.5 wt % alumina. It will be appreciated that the body can include a content of alumina within a range including any of the minimum and maximum percentages noted above.

Furthermore, the particulate material can have a body including at least about 50 wt % of the first phase for the total weight of the body. In other instances, the content of the first phase within the body may be greater, such as at least about 55 wt % or at least about 60 wt % or at least about 70 wt % or at least about 80 wt % or at least about 85 wt % or at least about 90 wt % or at least about 93 wt % or even at least about 95 wt % for the total weight of the body. Still, the body may include not greater than about 99.5 wt % of the first phase for the total weight of the body, such as not greater than about 99 wt % or not greater than about 98 wt % or even not greater than 95 wt % of the first phase for the total weight of the body. It will be appreciated that the content of the first phase within the body can be within a range between any of the minimum and maximum percentages noted above.

In yet another embodiment, the particulate material can include a first phase having grains defining individual single crystal domains or crystallites having an average crystallite size of not greater than about 5 microns. Still, in other instances, the average crystallite size of the first phase may be not greater than 4 microns or not greater than 3 microns or not greater than 2 microns or not greater than 1 micron or not greater than 0.9 microns or not greater than 0.8 microns or not greater than 0.7 microns or not greater than 0.6 microns or not greater than 0.5 microns or not greater than 0.4 microns. In one non-limiting embodiment, the average crystallite size of the first phase can be at least 0.01 microns or at least 0.05 microns or at least 0.1 microns. It will be appreciated that the average crystallite size of the first phase can be within a range between any of the minimum and maximum values noted above. A domain can include a single crystal or a group of crystals having the same or substantially the same alignment when viewed in two dimensions.

The average crystallite size of the first phase can be measured using scanning electron microscope (SEM) photomicrographs and imaging analysis software, such as ImageJ. Samples of abrasive grains are prepared by making a bakelite mount in epoxy resin then polished with one or more polishing slurries in a manner to make the crystal grains clearly visible when viewed by SEM. For example, a series of polishing pads and polishing slurries from 45 microns to a submicron polishing slurry were used at a speed of approximately 200-300 RPMs under a weight of 20-30 lbs. Individual grains (5-10 grits) are mounted on the SEM mount then gold coated for SEM preparation. SEM photomicrographs of five individual abrasive particles are taken at approximately 50,000× magnification. The average crystallite size is calculated using the following steps: 1) using image analysis software, for each image, six horizontal lines are drawn across the image at regularly spaced intervals 2) the user marks the points at which any of the lines cross grain boundaries; 3) using the imaging software or similar computer aided analysis tool, the length of each of the lines between the intersection points is measured and identified as a crystal length, 4) the raw data of crystal length is exported to a spreadsheet for calculation of an average that represents the average crystal size for the sample image. The same process is conducted for each of the five individual abrasive particles and the results are averaged to determine the average crystallite size for the first phase.

As noted herein, the body can further include a second phase. For certain particulate materials according to embodiments herein, the body can consist essentially of the first phase and the second phase. In one instance, the body can include at least 0.1 wt % of the second phase for the total weight of the body. For other embodiments, the content of the second phase within the body can be greater, such as at least about 0.2 wt % or at least about 0.5 wt % or at least about 0.8 wt % or at least about 1 wt % or at least about 1.3 wt % or at least about 1.5 wt % or at least about 1.8 wt % or at least about 2 wt % or at least 2.2 wt % or at least 2.5 wt %. Still, the content of the second phase within the body may be limited, such that it may be not greater than about 10 wt %, such as not greater than about 8 wt % or not greater than about 7 wt % or not greater than about 6 wt % or not greater than about 5 wt % or not greater than about 4 wt % or not greater than about 3.5 wt % or not greater than about 3 wt % or not greater than about 2.8 wt % or not greater than about 2.6 wt % or not greater than about 2.5 wt %. It will be appreciated that the content of the second phase within the body can be within a range between any of the minimum and maximum percentages noted above.

The second phase can be distinct from the first phase by at least one of average grain size, composition, content, crystal structure, aspect ratio, or any combination thereof. In accordance with an embodiment, the second phase can include an oxide. In certain instances, the second phase can include strontium (Sr), cerium (Ce), or any combination thereof. The strontium and cerium may be in the form of one or more chemical compounds, and particularly, an oxide compound. For example, the strontium and cerium may be in the form of a magnetoplumbite structure, such as $CeSrAl_{11}O_{19}$. In at least one embodiment, the second phase consists essentially of strontium and cerium, and more particularly, strontium and cerium in the form of an oxide compound. The second phase may include a crystalline material, and more particularly, may consist essentially of a crystalline material or polycrystalline material. The second phase may be free of any amorphous phase material.

In one embodiment, the second phase may be disposed at the grain boundaries of any of the other phases, such as the first phase. A majority of the second phase may be disposed as an intergranular phase (i.e., between grains at the grain boundaries) between any of the phases described in embodiments herein. For example, at least 60% of the total content of the second phase can be disposed at the grain boundaries of the first phase. In other embodiments, the amount of second phase disposed at the grain boundaries can be greater, such as at least about 70% of the second phase, at least about 80% of the second phase, at least about 90% of the second phase, or even in some instances essentially all of the second phase can be disposed at the grain boundary of the first phase.

According to a particular embodiment, the second phase comprises a platelet shape. The platelet shape of the second phase can have a particular aspect ratio when viewed in two-dimensions, such as by scanning electron microscope based on a surface of a polished sample. Platelet shaped phases can have an aspect ratio of at least 1.1:1 for the length relative to the width, wherein the length is the longest dimension of the phase as viewed in two dimensions and the width is the longest dimension extending perpendicular to the length as viewed in the same plane as the length. The second phase can have a platelet shape, whereas the first phase may have a more equiaxed shape as viewed in two-dimensions.

According to one embodiment, the second phase can include platelets having a length (l) and a width (w), wherein the length is greater than the width. More particularly, the platelets of the second phase can have an average primary aspect ratio of length:width of at least 1.2:1, such as at least 1.3:1 or at least 1.3:1 or at least 1.4:1 or at least 1.5:1 or at least 1.7:1 or at least 1.8:1 or at least 1.9:1 or at least 2:1 or at least 2.3:1 or at least 2.5:1 or at least 3:1 or at least 4:1 or at least 5:1 or at least 7:1 or at least 10:1. In still another embodiment, the platelets of the second phase can have an average primary aspect ratio of length:width of not greater than 1000:1 or not greater than 750:1 or not greater than 500:1 or not greater than 100:1 or not greater than 50:1 or not greater than 20:1 or not greater than 10:1. It will be appreciated that the platelets of the second phase can have an average primary aspect ratio within a range including any of the minimum and maximum ratios noted above.

In more particular instances, the platelets of the second phase can have an average length of at least 0.2 microns, such as at least 0.3 microns or at least 0.4 microns or at least 0.5 microns or at least 0.6 microns or at least 0.7 microns or at least 0.8 microns or at least 0.9 microns or at least 1 microns or at least 1.2 microns or at least 1.5 microns. Still, in another non-limiting embodiment, the average length of the platelets of the second phase can be not greater than 10 microns or not greater than 9 microns or not greater than 8 microns or not greater than 7 microns or not greater than 6 microns or not greater than 5 microns or not greater than 4 microns or not greater than 3 microns or not greater than 2 microns or not greater than 1.5 microns. It will be appreciated that the average length can be within a range including any of the minimum and maximum values noted above.

It will be appreciated that the length and width of the platelets is measured according to the following process. A sample of the material is prepared in the same manner as described above for the measurement of the average crystallite size, including preparation and imaging of five randomly selected abrasive particles. For each of the particles, a random region of the particle is viewed using a scanning electron microscope at approximately 20,000×. An image of the sample is obtained and analyzed using imaging software, such as ImageJ. For each crystallite of the second phase presented in the image, a line is drawn along the length of the crystallite, wherein the length represents the longest dimension. The line may be drawn with the assistance of imaging software such as ImageJ. The process is repeated five times for each of the five samples of particles. The results are tabulated and averaged to calculate the average length of the crystallites of the second phase.

In another embodiment, the platelets of the second phase can have an average width of at least 0.02 microns, such as at least 0.05 microns or at least 0.08 microns or at least 0.1 microns or at least 0.12 microns or at least 0.15 microns or at least 0.18 microns or at least 0.2 microns or at least 0.22 microns or at least 0.25 microns or at least 0.3 microns. Still, in another non-limiting embodiment, the average width of the platelets of the second phase can be not greater than 5 microns or not greater than 3 microns or not greater than 2 microns or not greater than 1 micron or not greater than 0.8 microns or not greater than 0.6 microns or not greater than 0.4 microns or not greater than 0.3 microns or not greater than 0.2 microns or not greater than 0.15 microns. It will be appreciated that the average width can be within a range including any of the minimum and maximum values noted above.

The average width of the platelets of the second phase can be measured using the same procedure as noted above for the measurement of the length of the platelets of the second phase. However, the width was measured at the midpoint of the line used to measure the length. The line representing the width was drawn in a direction perpendicular to the line representing the length as close as possible to the midpoint of the line representing the length.

The particulate material can have a body that includes a particular ratio of size of grains of the first phase and second phase. For example, the body can include a first phase having a first average crystallite size and a second phase having an average length of the platelets. In certain instances, the average length of the platelets can be greater than the first average crystallite size of the first phase. Moreover, in at least one aspect, the body can have a ratio (G2/G1) wherein G1 represents the average grain size of the first phase and G2 represents the average length of the platelets of the second phase. In accordance with a particular embodiment, the ratio (G2/G1) can have a value of at least about 1.1, such as at least about 1.5, at least about 2, at least about 3, at least about 5, at least about 8, at least about 10, at least about 15, a least about 20, or even at least about 50. Still, in at least one embodiment, the ratio (G2/G1) may be not greater than about 500, such as not greater than about 200, or even not greater than about 100. It will be appreciated that the body can include a ratio (G2/G1) within a range between any of the above minimum and maximum values.

The second phase may be formed from one or more additives that may be added to the raw material powder. According to one embodiment, the body can include a particular content of strontium and cerium, which may facilitate formation of the second phase, and more particularly, the desired microstructure and content of platelets. It will be appreciated that reference herein to a second phase including strontium (Sr) and cerium (Ce) includes oxides including strontium and cerium, including for example strontium oxide and cerium oxide. The second phase may include strontium oxide, cerium oxide, and/or a compound or complex oxide including strontium and cerium in an oxide form. The second phase may be a monocrystalline, polycrystalline or amorphous material. In one particular embodiment, the platelets of the second phase are polycrystalline material.

As noted herein, the body can include a particular content of strontium (Sr), such as at least 0.2 wt % for a total weight of the body. In certain other instances, the content of strontium (Sr) in the body can be at least 0.3 wt % for a total weight of the body, such as at least 0.4 wt % Sr or at least 0.5 wt % or at least 0.6 wt % or at least 0.7 wt % or at least 0.8 wt % or at least 0.9 wt % or at least 1 wt % or at least 1.1 wt % or at least 1.2 wt % or at least 1.3 wt % or at least 1.4 wt % or at least 1.5 wt % or at least 1.6 wt % or at least 1.7 wt % or at least 1.8 wt % or at least 1.9 wt % or at least 2 wt % or at least 2.1 wt % or at least 2.2 wt % or at least 2.3 wt % or at least 2.4 wt % or at least 2.5 wt %. Still, in one non-limiting embodiment, the content of strontium (Sr) within the body can be not greater than 4.9 wt % for a total weight of the body, such as not greater than 4.8 wt % or not greater than 4.7 wt % or not greater than 4.6 wt % or not greater than 4.5 wt % or not greater than 4.4 wt % or not greater than 4.3 wt % or not greater than 4.2 wt % or not greater than 4.1 wt % or not greater than 4 wt % or not greater than 3.9 wt % or not greater than 3.8 wt % or not greater than 3.7 wt % or not greater than 3.6 wt % or not greater than 3.5 wt % or not greater than 3.4 wt % or not greater than 3.3 wt % or not greater than 3.2 wt % or not greater than 3.1 wt % or not greater than 3 wt % or not greater than 2.9 wt % or not greater than 2.8 wt % or not greater than 2.7 wt % or not greater than 2.6 wt % or not greater than 2.5 wt %. It will be appreciated that the content of strontium (Sr) in the body can be within a range including any of the minimum and maximum percentages noted above. It will also be appreciated that the foregoing contents of strontium in the body may be as part of a compound, such as an oxide compound.

In at least one embodiment, all of the strontium in the body can be contained within the second phase, and more particularly, the platelets of the second phase. The second phase may have a majority content of strontium, such that it includes at least 51 wt % strontium for the total content of the second phase.

The body may include a particular content of cerium (Ce), which may facilitate formation of the second phase, and more particularly, a particular microstructure with the desired content and/or shape of the platelets. According to one embodiment, the body can include at least 0.05 wt % cerium (Ce) for a total weight of the body. For example, the body can include at least 0.3 wt % cerium (Ce) for a total weight of the body or at least 0.4 wt % or at least 0.5 wt % or at least 0.6 wt % or at least 0.7 wt % or at least 0.8 wt % or at least 0.9 wt % or at least 1 wt % or at least 1.1 wt % or at least 1.2 wt % or at least 1.3 wt % or at least 1.5 wt %. Still, in one non-limiting embodiment, the body can include a content of cerium (Ce) that is not greater than 1.9 wt % for a total weight of the body, such as not greater than 1.8 wt % or not greater than 1.7 wt % or not greater than 1.6 wt % or not greater than 1.5 wt % or not greater than 1.4 wt % or not greater than 1.3 wt % or not greater than 1.2 wt % or not greater than 1.1 wt % or not greater than 1 wt % or not greater than 0.9 wt % or not greater than 0.8 wt % or not greater than 0.7 wt % or not greater than 0.6 wt % or not greater than 0.5 wt %. It will be appreciated that the content of cerium (Ce) in the body can be within a range including any of the minimum and maximum percentages noted above. The foregoing contents of cerium may be contents of cerium in a compound, such as an oxide compound.

In at least one embodiment, essentially all of the cerium in the body can be contained within the second phase, and more particularly, the platelets of the second phase. The second phase may have a minimum content of cerium, such that it includes at least 49 wt % cerium for the total content of the second phase.

According to one aspect, the body may have a particular ratio of strontium (Sr) and cerium (Ce) that may facilitate formation of the second phase, and more particularly, the desired microstructure and content and/or shape of the platelets. For example, the body can include a ratio of strontium to cerium (Sr:Ce) of at least 1:1, such as at least at least 1.5:1 or at least 1.8:1 or at least 2:1 or at least 2.5:1 or at least 3:1 or at least 3.5:1 or at least 4:1 or at least 4.5:1 or at least 5:1 or at least 6:1 or at least 8:1 or even at least 10:1. Still, in another embodiment, the body can include a ratio of strontium to cerium (Sr:Ce) of not greater than 10:1 or not greater than 9:1 or not greater than 8:1 or not greater than 7:1 or not greater than 6:1 or not greater than 5:1 or not greater than 4:1. It will be appreciated that the ratio of strontium to cerium (Sr:Ce) in the body can be within a range including any of the minimum and maximum percentages noted above. The ratio of strontium and cerium will be understood to be calculated from the weight percent of these materials in the oxide form, which may be measured via ICP analysis.

In another particular embodiment, the second phase consists essentially of strontium and cerium. Moreover, the ratio of strontium to cerium in the second phase can be controlled to facilitate formation of the desired microstructure and content and/or shape of the platelets. In such instances, the ratio of strontium to cerium (Sr:Ce) in the second phase can be at least 1:1, such as at least at least 1.5:1 or at least 1.8:1 or at least 2:1 or at least 2.5:1 or at least 3:1 or at least 3.5:1 or at least 4:1 or at least 4.5:1 or at least 5:1 or at least 6:1 or at least 8:1 or even at least 10:1. Still, in another embodiment, the ratio of strontium to cerium (Sr:Ce) in the second phase can be not greater than 10:1 or not greater than 9:1 or not greater than 8:1 or not greater than 7:1 or not greater than 6:1 or not greater than 5:1 or not greater than 4:1. It will be appreciated that the ratio of strontium to cerium (Sr:Ce) in the second phase, and more particularly, within the platelets can be within a range including any of the minimum and maximum percentages noted above.

Figure 2A:
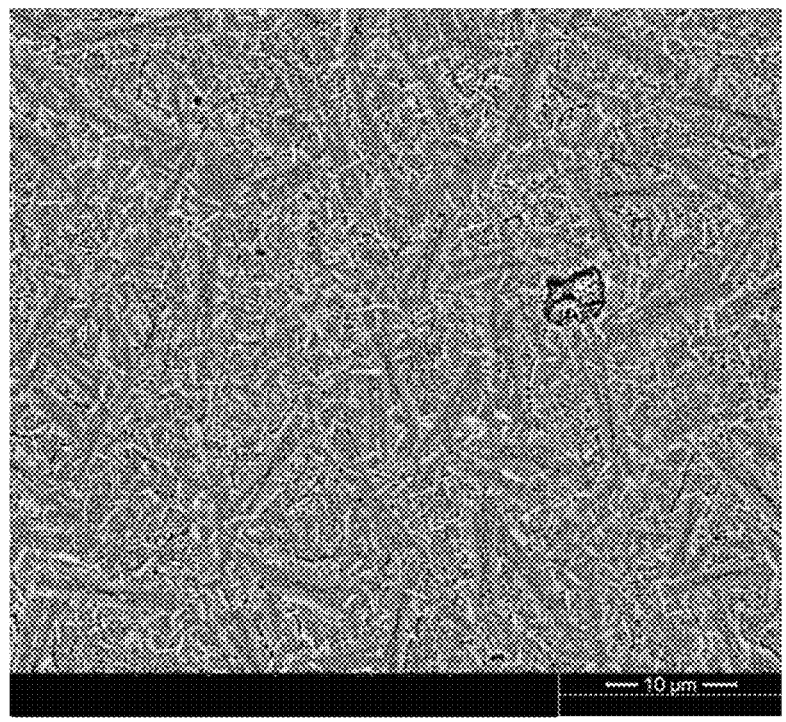
FIG. 2A includes a SEM image of a portion of a particulate material according to an embodiment.
Figure 2B:
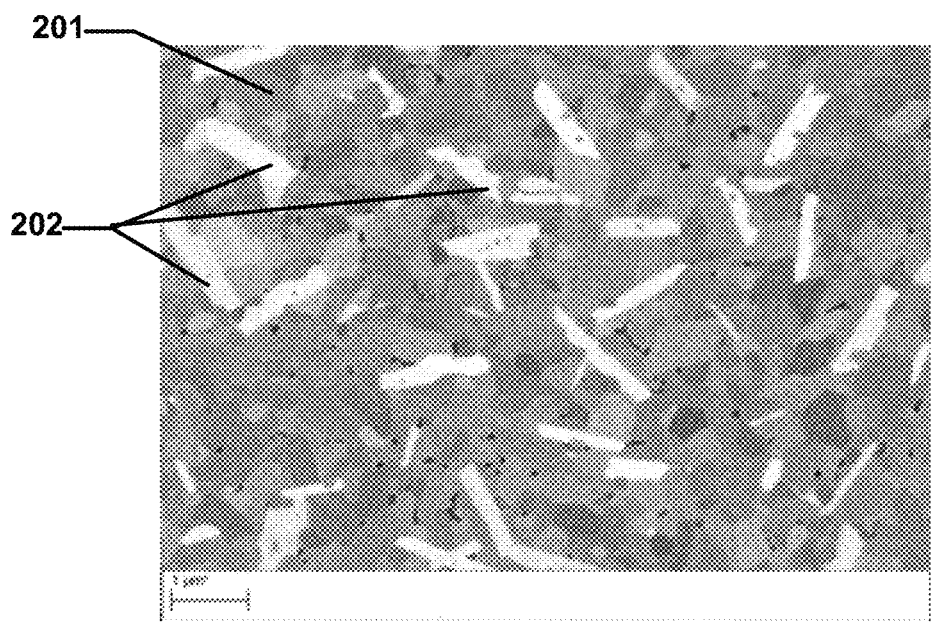
FIG. 2B includes a SEM image of a portion of a particulate material according to an embodiment.
Figure 2C:
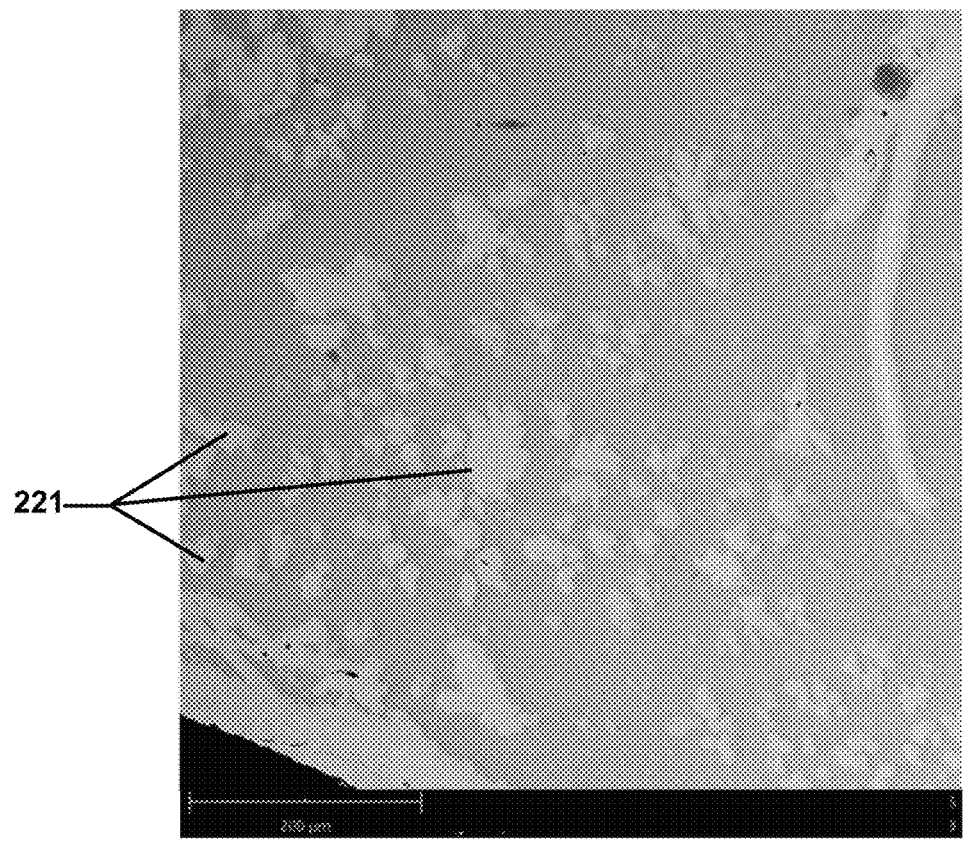
FIG. 2C includes a SEM image of a portion of a particulate material including platelet clusters.

FIGS. 2A, 2B, and 2C include scanning electron microscope (SEM) images of a microstructure of certain particulate materials. FIGS. 2A and 2B includes SEM images of a microstructure having a uniform distribution of platelets within the body at different magnifications. Notably, as illustrated in FIG. 2B, the body includes a first phase 201, which may include alumina, and a second phase 202, which can be in the form of platelets having the features of the embodiments herein. Notably, the platelets can be uniformly distributed throughout the body and uniformly distributed between the grains of the first phase. The second phase 202 can be substantially, uniformly dispersed throughout the volume of the body, such that if a statistically relevant and random sampling of different portions of the body was obtained, the content of the second phase 202 between each of the different samplings would be substantially the same. In certain embodiments, the variation of the second phase, which may be based upon a standard deviation, may be not greater than about 20% of the average value of the second phase for the body, as calculated by the equation (AVG/STDEV)×100%, wherein AVG represents the average content of the second phase for each of the different portions and STDEV represents the standard deviation of the content of the second phase for the sampling.

Figure 2D:
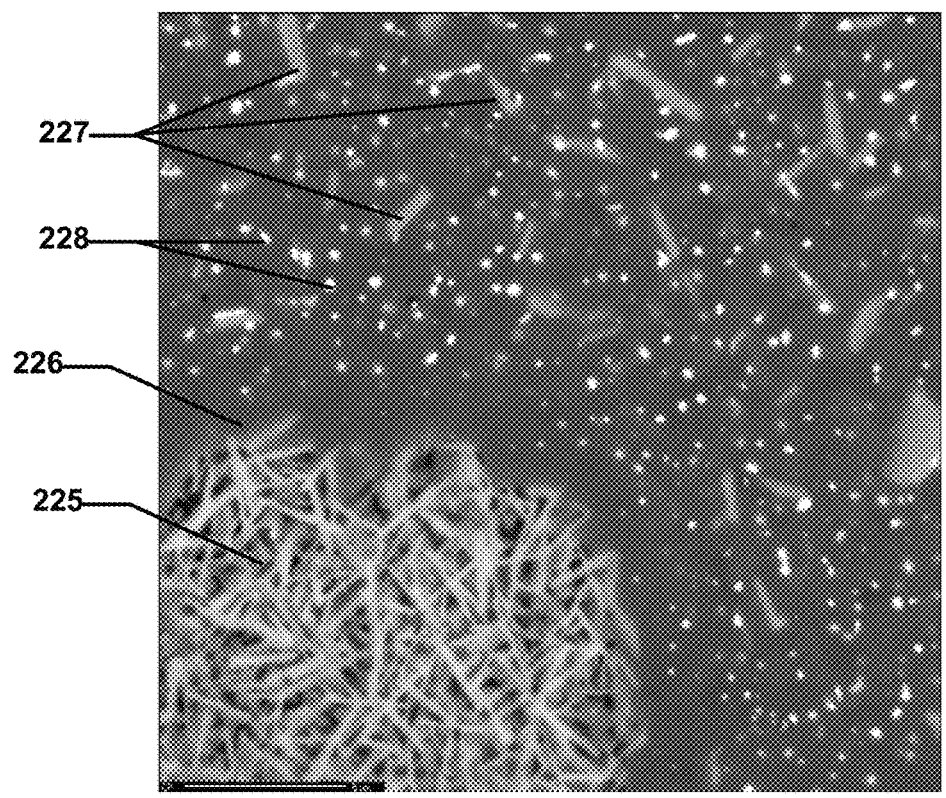
FIG. 2D includes a SEM image of a portion of a particulate material including platelet clusters.

FIGS. 2C and 2D include images of a microstructure including one or more platelet clusters as shown at different magnifications. In particular, FIG. 2C includes an image of a microstructure including a plurality of platelet clusters 221 within the body. The length of the line provided in the SEM image is 200 microns. FIG. 2D includes a magnified image of a platelet cluster 225. The length of the line provided in the SEM image is 5 microns. As shown in FIG. 2D, the platelet cluster 225 can be a porous region of the body and may not necessarily include a first phase. A platelet cluster is generally regarded as a grouping of platelets having a maximum dimension that is at least 2 times greater than the average length of the platelets. The platelet cluster 225 can be a region that is essentially free of the first phase and may include only a grouping of platelets of the second phase that are abutting each other with some porosity extending between the grouping of platelets. As further illustrated in FIG. 2D, at the boundary of the platelet cluster 225, the first phase 226 may be bonded to the platelet cluster. Moreover, certain regions away from the platelet cluster 225 may include a generally uniform distribution of platelets 227 within the first phase 226.

According to one embodiment, the body of the particulate material may have a limited content of platelet clusters. For example, the body may include not greater than 50 platelet clusters per 500 square microns, such as not greater than 40 platelet clusters per 500 square microns or not greater than 30 platelet clusters per 500 square microns or not greater than 20 platelet clusters per 500 square microns 10 platelet clusters per 500 square microns 5 platelet clusters per 500 square microns. Still, in one non-limiting embodiment, the body may be essentially free of platelet clusters. In yet another non-limiting embodiment, the body may include at least 1 platelet cluster per 500 square microns, such as at least 2 platelet clusters per 500 microns or at least 3 platelet clusters per 500 microns or at least 5 platelet clusters per 500 microns or at least 8 platelet clusters per 500 microns or at least 10 platelet clusters per 500 microns or at least 12 platelet clusters per 500 microns or at least 15 platelet clusters per 500 microns. It will be appreciated that the body can include a content of platelet clusters within a range including any of the minimum and maximum values noted above. In some instances, the content of the platelet clusters may be controlled to control the hardness and friability of the abrasive particulate.

In certain instances, the second phase may be non-uniformly dispersed within the body. For example, in one embodiment, the body can have a different content of the second phase at a peripheral region of the body as compared to a content of the second phase at a central region of the body. In certain instances, the body can have a greater content of the second phase at the peripheral region of the body as compared to the content of the second phase at a central region. In another embodiment, the body may have a greater content of the second phase at an exterior surface as compared to a central region of the body. Still, in one alternative embodiment, the content of the second phase may be greater at a central region as compared to the content of the second phase at a peripheral region.

Figure 3:
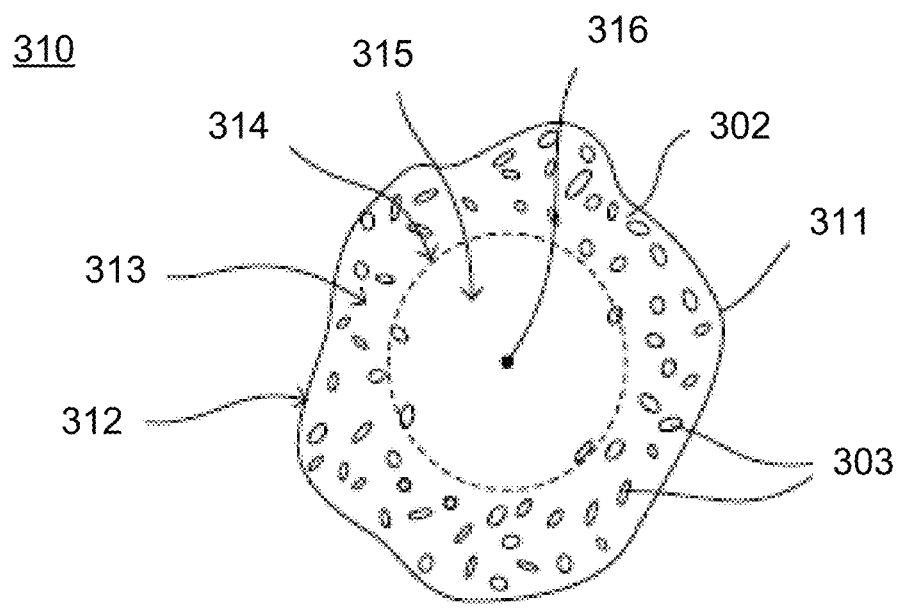
FIG. 3 includes an illustration of a particulate material according to an embodiment.

FIG. 3 includes an illustration of particulate material including a second phase non-uniformly dispersed within the body. As illustrated, the particulate material 310 can include a particle having a body 311 that can be formed of a first phase 302 and a second phase 303. The second phase 303 can be non-uniformly dispersed throughout the volume of the body 311. In particular, the body 311 can include a greater content of the second phase 303 within a peripheral region 313 as compared to the content of the second phase 303 within the central region 315. In such instances, the second phase 313 appears to create a "halo" in the body 311. The peripheral region 313 of the body 311 can extend from the exterior surface 312 into the volume of the body 311 for a distance that encompasses at least a majority of the second phase 303. In particular instances, the peripheral region 313 can be defined by the region encompassing at least about 90% of the second phase between the exterior surface 312 and a boundary 314 between the exterior surface 312 and the volumetric midpoint 316 of the body. For example, the peripheral region 313 may include at least about 5%, such as at least about 10%, at least about 20%, or even at least about 25% of the total volume of the body. The central region 315 of the body 311 may be a region surrounding the volumetric midpoint 316 of the body and extending out in three dimensions to a boundary 314. The central region may be at least about 5%, such as at least about 10%, at least about 20% or even at least about 25% of the total volume of the body. The above illustration is not limiting, and it will be appreciated that various particles may be made to form a peripheral region and a central region of different sizes and shapes.

It will be appreciated that foregoing embodiments describing certain distributions of the second phase within the body can be the same for other phases of the particulate material. For example, as will be described in more detail herein, the particulate material can include additional phases distinct from the first and second phases (e.g., a third phase, a fourth phase, a fifth phase, etc.), and such phases can be substantially uniformly dispersed through the volume of the body, or alternatively, may be distributed in a non-uniform manner. For example, in one embodiment, the particulate material can include a body having a non-uniform distribution of a second phase and a third phase within the volume of the body. More particularly, the body can have a greater content of the second phase at a peripheral region compared to a central region, and the body may also have a greater content of the third phase at the central region compared to the peripheral region. Still, in other instances, the body can include multiple phases having different distribution characteristics. For example, the second phase may be substantially, uniformly distributed throughout the volume of the body and a third phase may be non-uniformly distributed throughout the body.

In at least one aspect, the body may consist essentially of only the first phase and the second phase. In such instances, the body may be essentially free of any other phases except for the first phase and second phase. For such embodiments, the body may include only impurity contents of other elements, compounds, and phases.

However, as illustrated in FIG. 2D, the body may include a third phase of material that is distinct from the first phase 226 and second phase 227 of the body. The third phase 228 may be uniformly distributed throughout the body. The third phase may be disposed at the grain boundaries between the first and second phases. It will be appreciated that the third phase may be present in other embodiments, and it is not necessary that the third phase only be present with clusters of platelets. For example, it is plausible that the microstructures shown in FIGS. 2A and 2B may be formed to include a third phase. It is also possible, that any of the microstructures of the embodiments herein can be free of a third phase.

In certain instances, the body may include a third phase, which may facilitate improved manufacturing and/or performance of the particulate material. According to one embodiment, the third phase may include at least one of an oxide, carbide, nitride, boride, or any combination thereof. In certain instances, the third phase may include strontium, cerium, or any combination thereof. In another embodiment, the third phase may include a composition, such as an oxide compound, including at least one element selected from the group consisting of Li, Na, K, Mg, Ca, Sr, Ba, Y, Zr, Ti, Mn, Fe, Nb, Mo, Hf, Ta, La, Cr, Co, Ni, Cu, Zn, or any combination thereof. Certain embodiments herein can include a particulate material having a body consisting essentially of the first phase, second phase, and the third phase.

The body may include a particular content of the third phase, which may facilitate improved manufacturing and/or performance of the particulate material. For example, the third body may include not greater than 5 wt % of the third phase for the a total weight of the body, such as not greater than 4 wt % or not greater than 3 wt % or not greater than 2 wt % or not greater than 1 wt % or not greater than 0.5 wt % or not greater than 0.1 wt %. Still, in one non-limiting embodiment, the body can include at least 0.1 wt % of the third phase for the total weight of the body, such as at least 0.5 wt % or at least 1 wt % or even at least 2 wt %.

In one aspect, the third phase may have a particular average crystallite size relative to the first and second phases. For example, the third phase can have an average crystallite size that is less than the average crystallite size of the first phase. Reference herein to the average crystallite size of the third phase is reference to the average size of the crystallites or domains of the third phase and is measured in the same manner as noted for the first phase. Moreover, the third phase may have an average crystallite size that is less than the average length of the platelets of the second phase. In yet another embodiment, the third phase may have an average crystallite size that is less than the average width of the platelets of the second phase.

The third phase may be an integral phase within the body. As noted herein, the third phase may be substantially uniformly dispersed through the entire volume of the body. Alternatively, the third phase may be non-uniformly dispersed within the body, including for example, but not limited to, disposed in a "halo" manner as described in embodiments herein. Additionally, a majority of the third phase may be disposed as an intergranular phase (i.e., between grains at the grain boundaries) between any of the phases described in embodiments herein.

In certain instances, the particulate material includes a body having a particular ratio (W1/W3), wherein W1 represents the weight percent of the first phase of the body and W3 represents the weight percent of the third phase within the body. In at least one aspect, the ratio (W1/W3), can be at least about 1, such as at least about 1.1, at least about 1.5, at least about 2, at least about 3, at least about 5, at least about 8, at least about 10, at least about 15, at least about 20, at least about 50, or even at least about 70. Still, in another embodiment the ratio (W1/W3) can be not greater than about 100, or even not greater than about 95. It will be appreciated that the body can have a ratio (W1/W3) within a range between any of the minimum and maximum values provided above.

Furthermore, in another aspect, the particulate material can include a body having a ratio (W3/W2), wherein W2 represents a weight percent of the second phase with the body and W3 represents a weight percent of the third phase within the body. In particular instances, the ratio (W3/W2) can be at least about 0.1, such as at least about 0.3, at least about 0.5, at least about 0.7, at least about 0.9, at least about 1, at least about 1.1, at least about 1.5, at least about 2, at least about 4, at least about 6, or even at least about 10. Still, in yet another embodiment, the body can have a ratio (W3/W2) that is not greater than about 10, for example, not greater than about 7, not greater than about 5, not greater than about 3, not greater than about 2.5, not greater than about 2.2, not greater than about 2, not greater than about 1.5, not greater than about 1, not greater than about 0.9, or even not greater than about 0.7. It will be appreciated that the ratio (W3/W2) can be within a range between any of the above minimum or maximum values.

In accordance with another aspect, the particulate material can be formed such that the average crystallite size of the third phase has a particular relationship to the average crystallite size of the first phase and/or the average length of the platelets of the second phase. For example, the particulate material can include a body having a first phase including a first average crystallite size and a third phase having a third average crystallite size. In certain instances, the first phase can have a first average crystallite size that is different than the third average crystallite size of the third phase. More particularly, the body can include a ratio (G1/G3) wherein G1 represents the average crystallite size of the first phase and G3 represents the average crystallite size of the third phase. In at least one instance, the ratio (G1/G3) can be at least 0.2, such as at least 0.5 or at least about 0.8 or at least 1 or at least about 1.1 or at least 1.5 or at least 2 or at least 3 or even at least 5. Still, in another embodiment, the ratio (G1/G3) can be not greater than 5, such as not greater than 2 or not greater than 1 or not greater than 0.8 or not greater than about 0.5. It will be appreciated that the ratio (G1/G3) can have a value within a range between any of the minimum or maximum values noted above.

For certain embodiments, the second phase can have an average length of the platelets that is different than the third average crystallite size of the third phase, and more particularly, may be greater than the third average crystallite size of the third phase. In at least one instance, the body can have a ratio (G2/G3) wherein G2 represents the average length of the platelets of the second phase and G3 represents the third average crystallite size of the third phase. The ratio (G2/G3) can be at least 1, such as at least 2 or at least 3 or at least 4 or at least 5 or at least 8 or at least 10. Still, in one non-limiting embodiment, the ratio (G2/G3) may not be greater than 30, such as not greater than about 25 or not greater than 20 or not greater than 15 or not greater than about 10 or even not greater than 5. It will be appreciated that the ratio (G2/G3) can be within a range between any of the minimum and maximum values note above.

The body can include a third phase having an average crystallite size of not greater than 100 µm. In other instances, the average grain size of the third phase may be less, such as not greater than 50 µm or not greater than 20 µm or not greater than 10 µm or not greater than 1 µm or not greater than 0.8 µm or not greater than 0.5 µm or even not greater than about 0.2 µm. Still, the average crystallite size of the third phase may be at least 0.1 µm, such as at least about at least 0.5 µm or at least about 1 µm. It will be appreciated that the third phase can have an average crystallite size within a range of the minimum and maximum values noted above.

Figure 4:
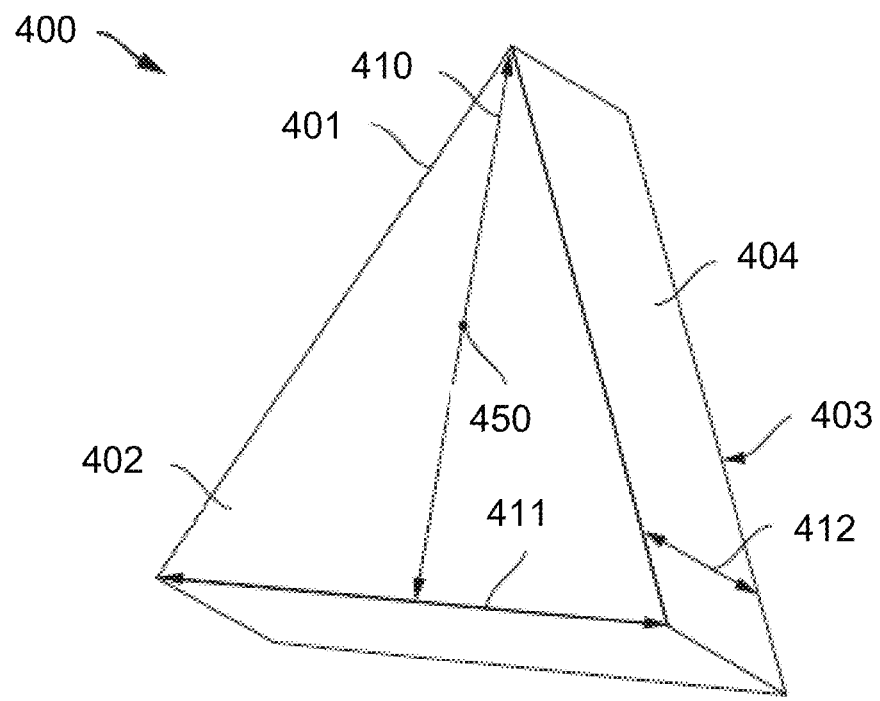
FIG. 4 includes a perspective view illustration of a shaped abrasive particle according to an embodiment.
Figure 5:
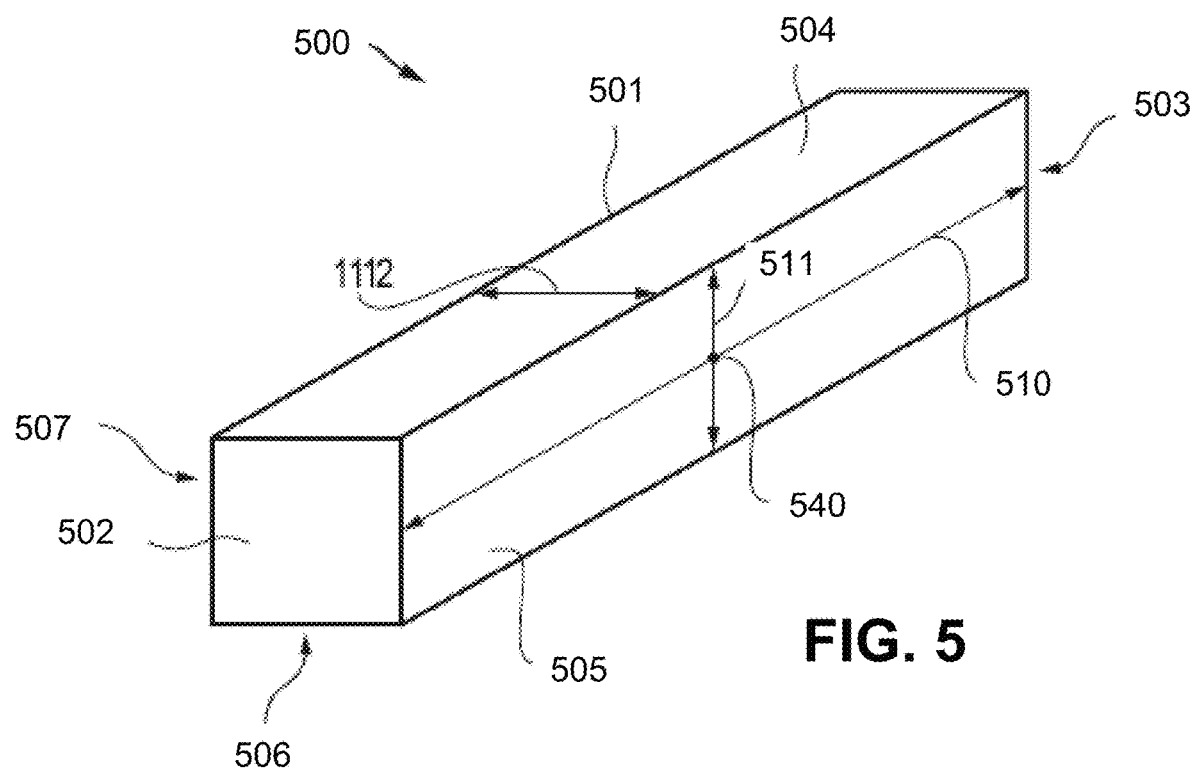
FIG. 5 includes a perspective view illustration of a shaped abrasive particle according to an embodiment.

In yet another embodiment, the particulate material can have a body that can be in the form of a non-shaped abrasive particle, a shaped abrasive particle, or any combination thereof. FIGS. 4, 5, and 6 include images of shaped and non-shaped abrasive particles. In particular, FIG. 4 includes an illustration of a shaped abrasive particle having a two-dimensional shape as defined by the plane of the upper major surface 402 or lower major surface 403, which has a generally triangular two-dimensional shape. It will be appreciated that the shaped abrasive particles of the embodiments herein are not so limited and can include other two-dimensional shapes. For example, the shaped abrasive particles of the embodiment herein can include particles having a body with a two-dimensional shape as defined by a major surface of the body from the group of shapes including polygons, irregular polygons, irregular polygons including arcuate or curved sides or portions of sides, ellipsoids, numerals, Greek alphabet characters, Latin alphabet characters, Russian alphabet characters, Kanji characters, complex shapes having a combination of polygons shapes, shapes including a central region and a plurality of arms (e.g., at least three arms) extending from a central region (e.g., star shapes), and a combination thereof. Particular polygonal shapes include rectangular, trapezoidal, quadrilateral, pentagonal, hexagonal, heptagonal, octagonal, nonagonal, decagonal, and any combination thereof. In another instance, the finally-formed shaped abrasive particles can have a body having a two-dimensional shape such as an irregular quadrilateral, an irregular rectangle, an irregular trapezoid, an irregular pentagon, an irregular hexagon, an irregular heptagon, an irregular octagon, an irregular nonagon, an irregular decagon, and a combination thereof. An irregular polygonal shape is one where at least one of the sides defining the polygonal shape is different in dimension (e.g., length) with respect to another side. As illustrated in other embodiments herein, the two-dimensional shape of certain shaped abrasive particles can have a particular number of exterior points or external corners. For example, the body of the shaped abrasive particles can have a two-dimensional polygonal shape as viewed in a plane defined by a length and width, wherein the body comprises a two-dimensional shape having at least 4 exterior points (e.g., a quadrilateral), at least 5 exterior points (e.g., a pentagon), at least 6 exterior points (e.g., a hexagon), at least 7 exterior points (e.g., a heptagon), at least 8 exterior points (e.g., an octagon), at least 9 exterior points (e.g., a nonagon), and the like.

The shaped abrasive particle 400 of FIG. 4 can include a body 401 including a major surface 402, a major surface 403, and a side surface 404 extending between the major surfaces 402 and 403. As illustrated in FIG. 4, the body 401 of the shaped abrasive particle 400 can be a thin-shaped body, wherein the major surfaces 402 and 403 are larger than the side surface 404. Moreover, the body 401 can include a longitudinal axis 410 extending from a point to a base and through the midpoint 450 on the major surface 402. The longitudinal axis 410 can define the longest dimension of the major surface extending through the midpoint 450 of the major surface 402. The body 401 can further include a lateral axis 411 defining a width of the body 401 extending generally perpendicular to the longitudinal axis 410 on the same major surface 402. Finally, as illustrated, the body 401 can include a vertical axis 412, which in the context of thin shaped bodies can define a height (or thickness) of the body 401. For thin-shaped bodies, the length of the longitudinal axis 410 is equal to or greater than the vertical axis 412. As illustrated, the thickness 412 can extend along the side surface 404 between the major surfaces 402 and 403 and perpendicular to the plane defined by the longitudinal axis 410 and lateral axis 411. It will be appreciated that reference herein to length, width, and height of the abrasive particles may be reference to average values taken from a suitable sampling size of abrasive particles of a larger group, including for example, a group of abrasive particle affixed to a fixed abrasive.

The shaped abrasive particles of the embodiments herein, including thin shaped abrasive particles can have a primary aspect ratio of length:width such that the length can be greater than or equal to the width. Furthermore, the length of the body 401 can be greater than or equal to the height. Finally, the width of the body 401 can be greater than or equal to the height. In accordance with an embodiment, the primary aspect ratio of length:width can be at least 1:1, such as at least 1.1:1, at least 1.2:1, at least 1.5:1, at least 1.8:1, at least 2:1, at least 3:1, at least 4:1, at least 5:1, at least 6:1, or even at least 10:1. In another non-limiting embodiment, the body 401 of the shaped abrasive particle can have a primary aspect ratio of length:width of not greater than 100:1, not greater than 50:1, not greater than 10:1, not greater than 6:1, not greater than 5:1, not greater than 4:1, not greater than 3:1, not greater than 2:1, or even not greater than 1:1. It will be appreciated that the primary aspect ratio of the body 401 can be with a range including any of the minimum and maximum ratios noted above.

Furthermore, the body 401 can have a secondary aspect ratio of width:height that can be at least 1:1, such as at least 1.1:1, at least 1.2:1, at least 1.5:1, at least 1.8:1, at least 2:1, at least 3:1, at least 4:1, at least 5:1, at least 8:1, or even at least 10:1. Still, in another non-limiting embodiment, the secondary aspect ratio width:height of the body 401 can be not greater than 100:1, such as not greater than 50:1, not greater than 10:1, not greater than 8:1, not greater than 6:1, not greater than 5:1, not greater than 4:1, not greater than 3:1, or even not greater than 2:1. It will be appreciated the secondary aspect ratio of width:height can be with a range including any of the minimum and maximum ratios of above.

In another embodiment, the body 401 can have a tertiary aspect ratio of length:height that can be at least 1.1:1, such as at least 1.2:1, at least 1.5:1, at least 1.8:1, at least 2:1, at least 3:1, at least 4:1, at least 5:1, at least 8:1, or even at least 10:1. Still, in another non-limiting embodiment, the tertiary aspect ratio length:height of the body 401 can be not greater than 100:1, such as not greater than 50:1, not greater than 10:1, not greater than 8:1, not greater than 6:1, not greater than 5:1, not greater than 4:1, not greater than 3:1. It will be appreciated that the tertiary aspect ratio the body 401 can be with a range including any of the minimum and maximum ratios noted above.

The abrasive particles of the embodiments herein, including the shaped abrasive particles can include a crystalline material, and more particularly, a polycrystalline material including those compositions and morphologies described in embodiments herein. The particulate material can be formed such that the body includes a crystalline material, and more particularly, a polycrystalline material. Notably, the polycrystalline material can include abrasive grains. In one embodiment, the body can be essentially free of an organic material, including for example, a binder. More particularly, the body can consist essentially of a polycrystalline material.

FIG. 5 includes a perspective view illustration of a shaped abrasive particle according to another embodiment. Notably, the shaped abrasive particle 500 can include a body 501 including a surface 502 and a surface 503, which may be referred to as end surfaces 502 and 503. The body can further include surfaces 504, 505, 506, 507 extending between and coupled to the end surfaces 502 and 503. The shaped abrasive particle of FIG. 5 is an elongated shaped abrasive particle having a longitudinal axis 510 that extends along the surface 505 and through the midpoint 540 between the end surfaces 502 and 503. It will be appreciated that the surface 505 is selected for illustrating the longitudinal axis 510, because the body 501 has a generally square cross-sectional contour as defined by the end surfaces 502 and 503. As such, the surfaces 504, 505, 506, and 507 can be approximately the same size relative to each other. However, in the context of other elongated abrasive particles, the surfaces 502 and 503 can have a different shape, for example, a rectangular shape, and as such, at least one of the surfaces 504, 505, 506, and 507 may be larger relative to the others. In such instances, the largest surface can define the major surface and the longitudinal axis would extend along the largest of those surfaces. As further illustrated, the body 501 can include a lateral axis 511 extending perpendicular to the longitudinal axis 510 within the same plane defined by the surface 505. As further illustrated, the body 501 can further include a vertical axis 512 defining a height of the abrasive particle, were in the vertical axis 512 extends in a direction perpendicular to the plane defined by the longitudinal axis 510 and lateral axis 511 of the surface 505.

It will be appreciated that like the thin shaped abrasive particle of FIG. 4, the elongated shaped abrasive particle of FIG. 5 can have various two-dimensional shapes, such as those defined with respect to the shaped abrasive particle of FIG. 4. The two-dimensional shape of the body 501 can be defined by the shape of the perimeter of the end surfaces 502 and 503. The elongated shaped abrasive particle 500 can have any of the attributes of the shaped abrasive particles of the embodiments herein.

Figure 6A:
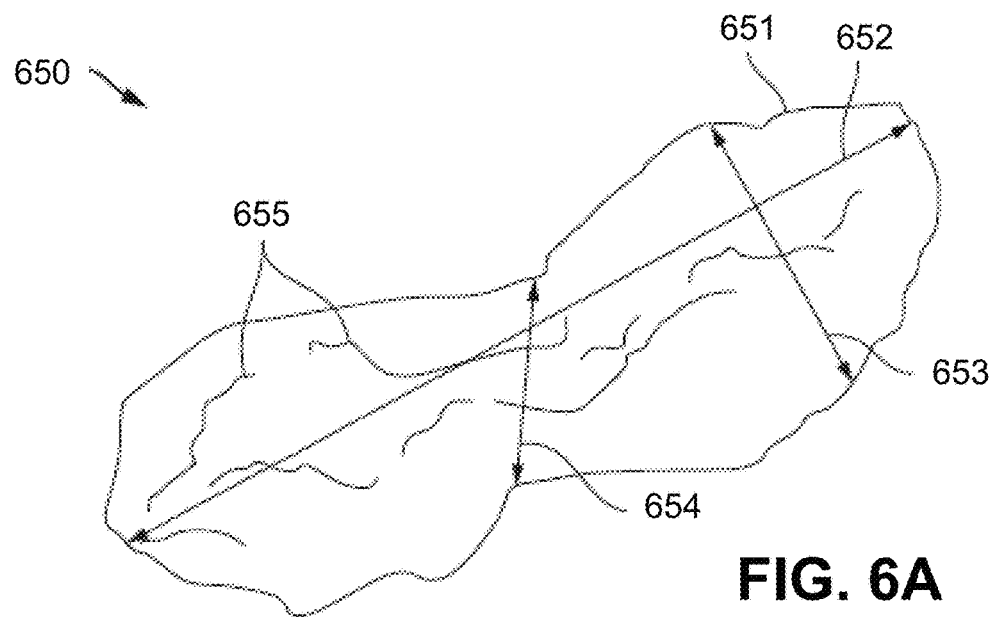
FIG. 6A includes a perspective view illustration of a non-shaped abrasive particle according to an embodiment.

FIG. 6A includes an illustration of a non-shaped particle, which may be an elongated, non-shaped abrasive particle or a secondary particle, such as a diluent grain, a filler, an agglomerate or the like. Shaped abrasive particles may be obtained through various processing methods, including but not limited to, printing, molding, pressing, stamping, casting, extruding, cutting, fracturing, heating, cooling, crystallizing, rolling, embossing, depositing, etching, scoring, and a combination thereof. Shaped abrasive particles are formed such that the each particle has substantially the same arrangement of surfaces and edges relative to each other. For example, a group of shaped abrasive particles generally have the same arrangement and orientation and or two-dimensional shape of the surfaces and edges relative to each other. As such, the shaped abrasive particles have a high shaped fidelity and consistency in the arrangement of the surfaces and edges relative to each other. By contrast, non-shaped particles can be formed through different process and have different shape attributes. For example, crushed grains are typically formed by a comminution process wherein a mass of material is formed and then crushed and sieved to obtain abrasive particles of a certain size. However, a non-shaped particle will have a generally random arrangement of the surfaces and edges, and generally will lack any recognizable two-dimensional or three dimensional shape in the arrangement of the surfaces and edges. Moreover, the non-shaped particles do not necessarily have a consistent shape with respect to each other and therefore have a significantly lower shape fidelity compared to shaped abrasive particles. The non-shaped particles generally are defined by a random arrangement of surfaces and edges for each particle and with respect to other non-shaped particles As further illustrated in FIG. 6A, the non-shaped particle can have a body 651 and a longitudinal axis 652 defining the longest dimension of the particle, a lateral axis 653 extending perpendicular to the longitudinal axis 652 and defining a width of the particle. Furthermore, the abrasive particle may have a height (or thickness) as defined by the vertical axis 654 which can extend generally perpendicular to a plane defined by the combination of the longitudinal axis 652 and lateral axis 653. As further illustrated, the body 651 of the non-shaped abrasive particle can have a generally random arrangement of edges 655 extending along the exterior surface of the body 651.

As will be appreciated, the abrasive particle can have a length defined by the longitudinal axis 652, a width defined by the lateral axis 653, and a vertical axis 654 defining a height. As will be appreciated, the body 651 can have a primary aspect ratio of length:width such that the length is equal to or greater than the width. Furthermore, the length of the body 651 can be equal to or greater than or equal to the height. Finally, the width of the body 651 can be greater than or equal to the height 654. In accordance with an embodiment, the primary aspect ratio of length:width can be at least 1.1:1, at least 1.2:1, at least 1.5:1, at least 1.8:1, at least 2:1, at least 3:1, at least 4:1, at least 5:1, at least 6:1, or even at least 10:1. In another non-limiting embodiment, the body 651 of the elongated shaped abrasive particle can have a primary aspect ratio of length:width of not greater than 100:1, not greater than 50:1, not greater than 10:1, not greater than 6:1, not greater than 5:1, not greater than 4:1, not greater than 3:1, or even not greater than 2:1. It will be appreciated that the primary aspect ratio of the body 651 can be within a range including any of the minimum and maximum ratios noted above.

Furthermore, the body 651 can include a secondary aspect ratio of width:height that can be at least 1.1:1, such as at least 1.2:1, at least 1.5:1, at least 1.8:1, at least 2:1, at least 3:1, at least 4:1, at least 5:1, at least 8:1, or even at least 10:1. Still, in another non-limiting embodiment, the secondary aspect ratio width:height of the body 651 can be not greater than 100:1, such as not greater than 50:1, not greater than 10:1, not greater than 8:1, not greater than 6:1, not greater than 5:1, not greater than 4:1, not greater than 3:1, or even not greater than 2:1. It will be appreciated the secondary aspect ratio of width:height can be with a range including any of the minimum and maximum ratios of above.

In another embodiment, the body 651 can have a tertiary aspect ratio of length:height that can be at least 1.1:1, such as at least 1.2:1, at least 1.5:1, at least 1.8:1, at least 2:1, at least 3:1, at least 4:1, at least 5:1, at least 8:1, or even at least 10:1. Still, in another non-limiting embodiment, the tertiary aspect ratio length:height of the body 651 can be not greater than 100:1, such as not greater than 50:1, not greater than 10:1, not greater than 8:1, not greater than 6:1, not greater than 5:1, not greater than 4:1, not greater than 3:1, It will be appreciated that the tertiary aspect ratio the body 651 can be with a range including any of the minimum and maximum ratios and above.

The elongated non-shaped abrasive particle 650 can have certain attributes of the other abrasive particles described in the embodiments herein, including for example but not limited to, composition, microstructural features (e.g., average grain size), hardness, porosity, and the like.

Figure 6B:
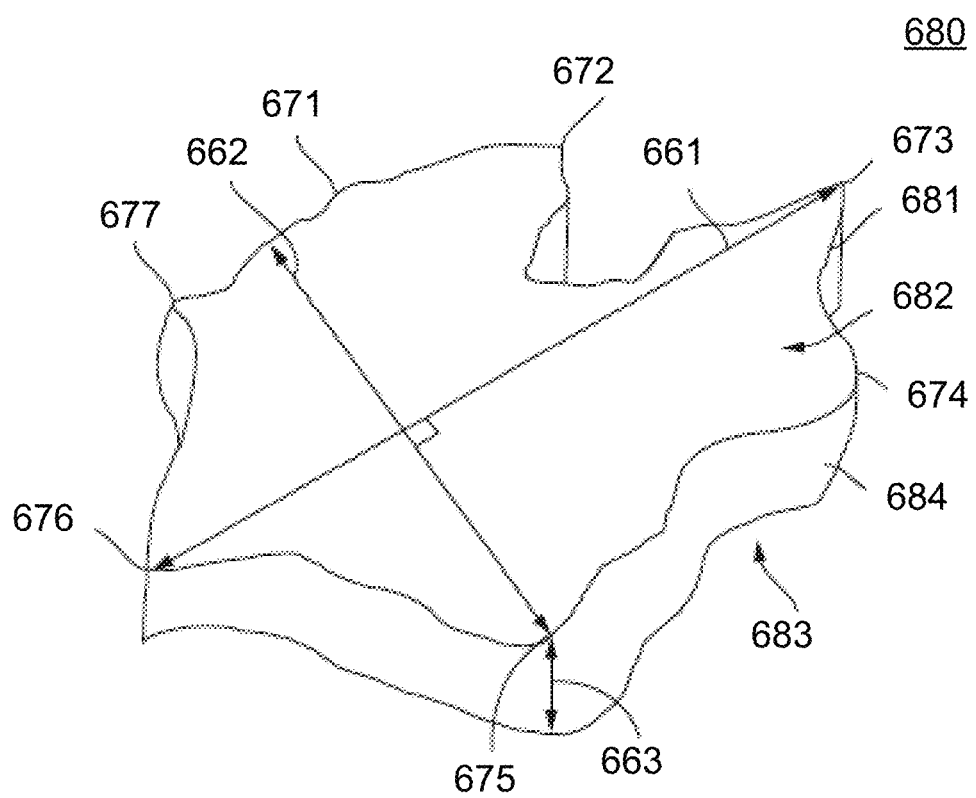
FIG. 6B includes a perspective view illustration of a constant thickness abrasive particle according to an embodiment.

FIG. 6B includes a perspective view illustration of another abrasive particle according to an embodiment. Notably, the abrasive particle 680 is a controlled thickness abrasive particle (CTAP) having a body 681 including a first major surface 682, a second major surface 683, and a side surface 684 extending between the first and second major surfaces 682 and 683. The body 681 may have a substantially uniform thickness as measured by the dimension extending between the first and second major surfaces 682 and 683. As illustrated in FIG. 6B, the body 681 can have a thin, relatively planar shape, wherein the first and second major surfaces 682 and 683 are larger than the side surface 684 and substantially parallel to each other. Moreover, the body 681 can include an axis 661, which is the longest dimension on the first major surface 682 and defines the length of the body 681. The body 681 can further include an axis 662 defining a second longest dimension of the body 681 on the first major surface 682, which extends perpendicular to the axis 661 and defines the width of the body 681. There may be dimensions greater on the first major surface 682 that do not extend perpendicular to the axis 661. Finally, as illustrated, the body 681 can include a vertical axis 663, which can define a height (or thickness) of the body 681. For thin-shaped bodies, the length of the axis 661 can be equal to or greater than the vertical axis 663. As illustrated, the height defined by the vertical axis 663 can extend along the side surface 684 between the first and second major surfaces 682 and 683 in a direction generally perpendicular to the plane defined by the axes 661 and 662. The vertical axis 663 may be best measured by placing the particle on a major surface and viewing the particle from the side and measuring the vertical height. It will be appreciated that reference herein to length, width, and height of the abrasive particles may be referenced to average values taken from a suitable sampling size of abrasive particles of a batch of abrasive particles.

As further illustrated, the body 681 of the abrasive particle 680 can have a side surface 684 having an irregular two-dimensional shape as viewed in the plane of the first or second major surfaces 682 or 683. An irregular two-dimensional shape is one in which the shape does not have a recognizable shape, such as a polygonal shape. The irregular two-dimensional shape is characterized by a side surface 684 that can have a random or unpredictable contour. Such an abrasive particle can be formed according to the processes of the embodiments herein, including for example, a process that include creating a thin layer of a material, patterning a portion of the material (e.g., the upper or lower surface), and drying the patterned layer of material in a manner to cause controlled cracking of the material. The controlled cracking may occur generally along the lines or indentations created during patterning. The body 681 can have external corners 671, 672, 673, 674, 675, 676, and 677 (771-777). The external corners 671-677 are portions that would cause significant deflection of an imaginary rubber band around the side surface 684 of the body 681 by at least 10 degrees or greater.

As noted herein, the particulate material can be an abrasive material. As such, the particulate material may be deployed in various manners for use in abrasive articles. For example, the particulate material may be part of a fixed abrasive article such as a coated abrasive article, bonded abrasive article, and a combination thereof. In particular instances, the particulate material can be coupled to a bond material, and further coupled to a backing or substrate via the bond material. The bond material may include compositions such as vitrified materials, ceramic materials, metal alloy, organic material, a resin, a polymer, and a combination thereof. In at least one instance, the particulate material can be part of a coated abrasive forming a single layer of abrasive particles coupled to a backing. In an alternative embodiment, the abrasive particles can be used as free abrasive particles.

Figure 7:
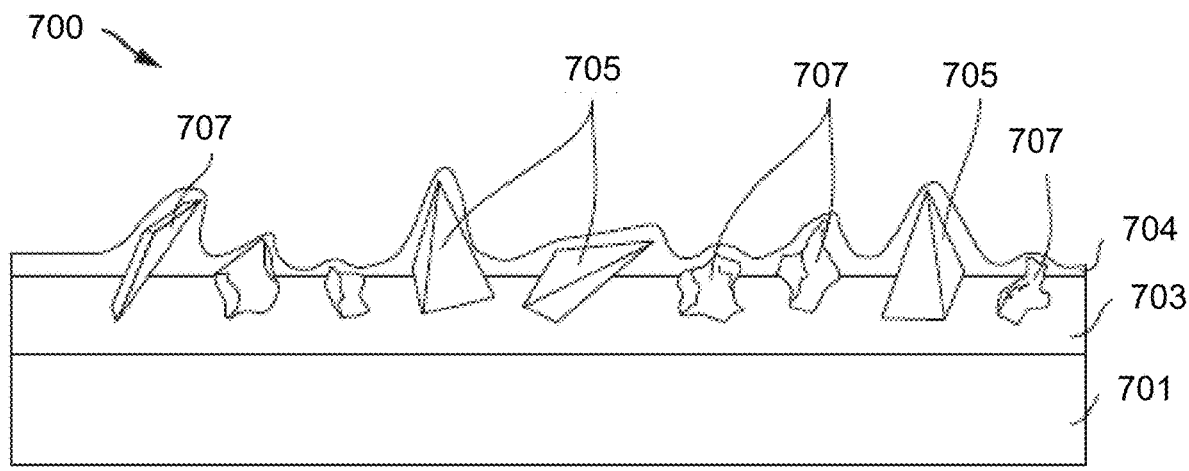
FIG. 7 includes an illustration of a portion of a coated abrasive article according to an embodiment.
Figure 8:
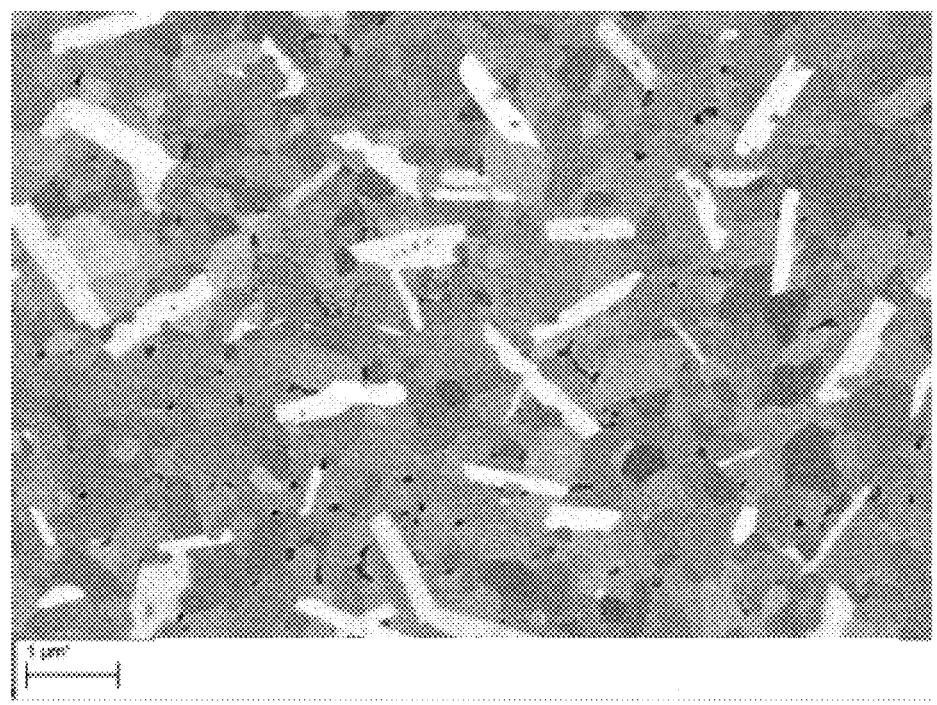
FIGS. 8-12 include SEM images of Samples made according to the Examples.
Figure 9:
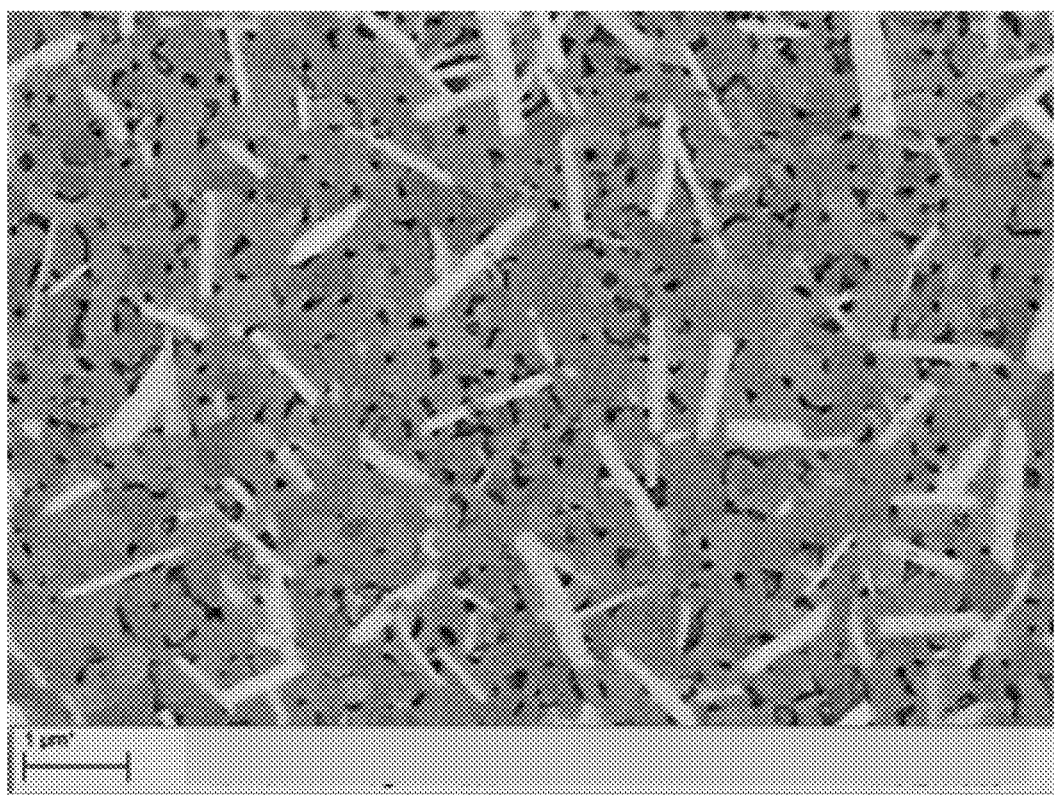
Figure 10:
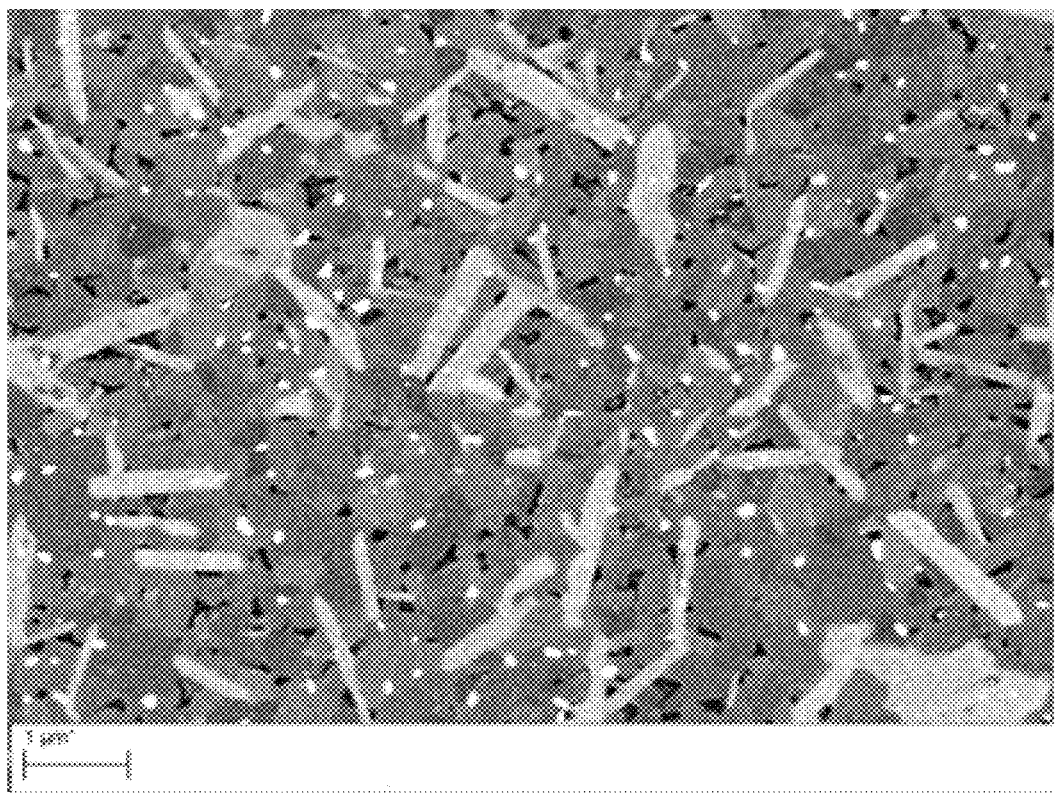
Figure 11:
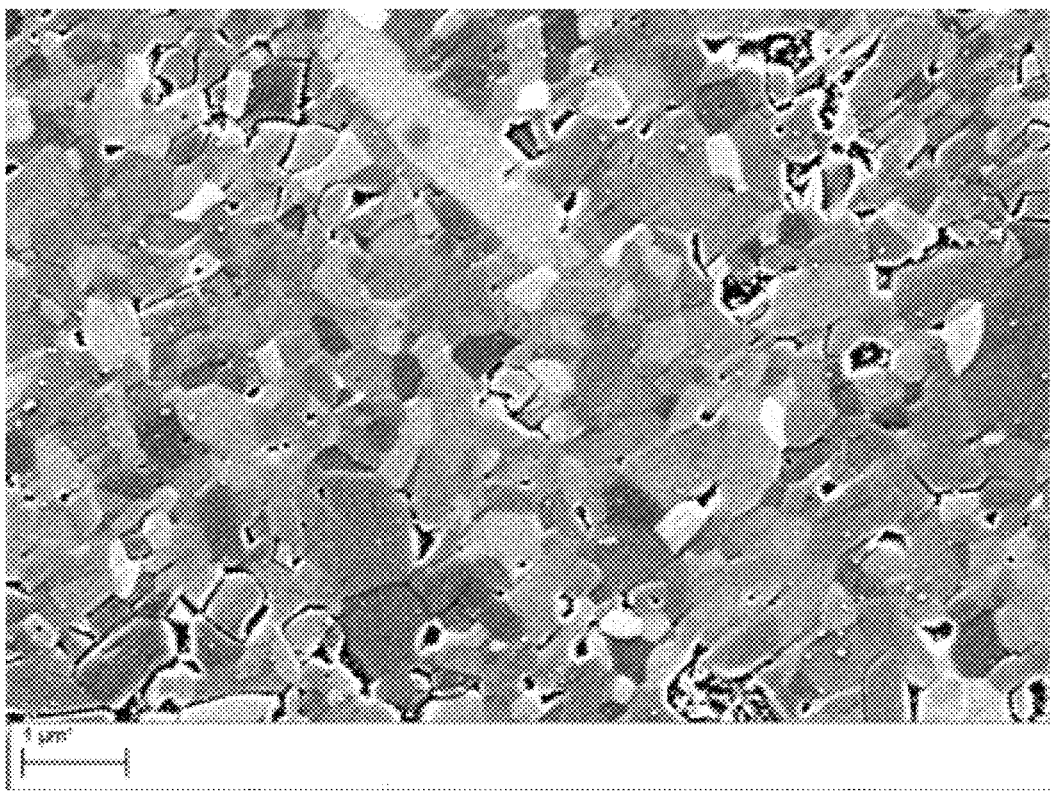
Figure 12:
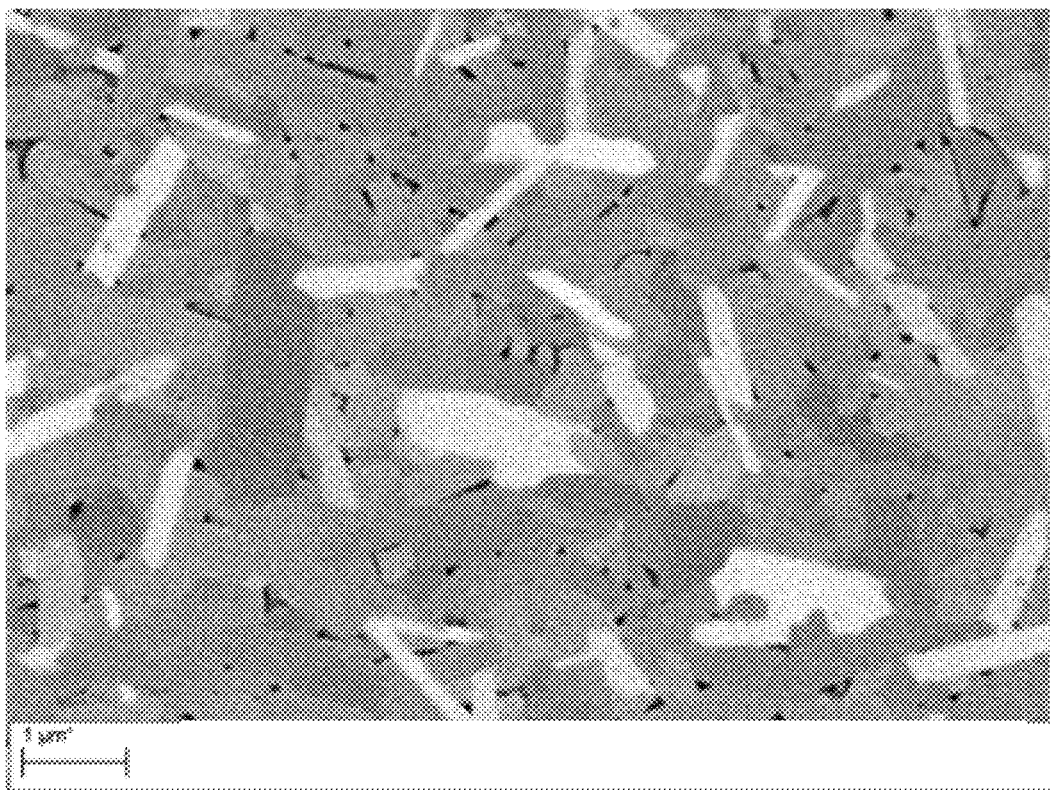

FIG. 7 includes an illustration of a portion of an abrasive article including particulate material in accordance with an embodiment. In particular, the abrasive article of FIG. 7 includes a coated abrasive 700 having a substrate 701 and at least one adhesive layer overlying a surface of the substrate 701. The adhesive layer can include one or more layers of material, including for example, a make coat 703 and/or a size coat 704. The coated abrasive 700 can include abrasive particulate material 710, which can include shaped abrasive particles 705 of the embodiments herein and a second type of abrasive particulate material 707 in the form of diluent abrasive particles having a random shape, which may not necessarily be shaped abrasive particles. The abrasive particulate material 707 can also be representative of the particulate material of the embodiments herein, including any combination of features of the embodiments herein. The make coat 703 can be overlying the surface of the substrate 701 and surrounding at least a portion of the shaped abrasive particles 705 and second type of abrasive particulate material 707. The size coat 704 can be overlying and bonded to the shaped abrasive particles 705 and second type of abrasive particulate material 707 and the make coat 703.

According to one embodiment, the substrate 701 can include an organic material, inorganic material, and a combination thereof. In certain instances, the substrate 701 can include a woven material. However, the substrate 701 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

A polymer formulation may be used to form any of a variety of layers of the abrasive article such as, for example, the frontfill, the pre-size coat, the make coat, the size coat, and/or the supersize coat. When used to form the frontfill, the polymer formulation may generally include a polymer resin, fibrillated fibers (preferably in the form of pulp), filler material, and other optional additives. Suitable formulations for some frontfill embodiments can include material such as a phenolic resin, wollastonite filler, defoamer, surfactant, a fibrillated fiber, and a balance of water. Suitable polymeric resin materials include curable resins selected from thermally curable resins including phenolic resins, urea/formaldehyde resins, phenolic/latex resins, as well as combinations of such resins. Other suitable polymeric resin materials may also include radiation curable resins, such as those resins curable using electron beam, UV radiation, or visible light, such as epoxy resins, acrylated oligomers of acrylated epoxy resins, polyester resins, acrylated urethanes and polyester acrylates and acrylated monomers including monoacrylated, multiacrylated monomers. The formulation can also comprise a non-reactive thermoplastic resin binder which can enhance the self-sharpening characteristics of the deposited abrasive composites by enhancing the erodibility. Examples of such thermoplastic resin include polypropylene glycol, polyethylene glycol, and polyoxypropylene-polyoxyethene block copolymer, etc. Use of a frontfill on the backing can improve the uniformity of the surface, for suitable application of the make coat and improved application and orientation of shaped abrasive particles in a predetermined orientation.

The make coat 703 can be applied to the surface of the substrate 701 in a single process, or alternatively, the abrasive particulate material 710 can be combined with a make coat 703 material and applied as a mixture to the surface of the substrate 701. Suitable materials of the make coat 703 can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the make coat 703 can include a polyester resin. The coated substrate can then be heated in order to cure the resin and the abrasive particulate material to the substrate. In general, the coated substrate 701 can be heated to a temperature of between about 100° C. to less than about 250° C. during this curing process.

The abrasive particulate material 710 can include shaped abrasive particles according to embodiments herein. In particular instances, the abrasive particulate material 710 may include different types of shaped abrasive particles. The different types of shaped abrasive particles can differ from each other in composition, two-dimensional shape, three-dimensional shape, size, and a combination thereof as described in the embodiments herein. As illustrated, the coated abrasive 700 can include a shaped abrasive particle 705 having a generally triangular two-dimensional shape.

The other type of abrasive particles 707 can be non-shaped abrasive particles, which may include diluent particles that are different than the shaped abrasive particles 705. For example, the diluent particles can differ from the shaped abrasive particles 705 in composition, two-dimensional shape, three-dimensional shape, size, and a combination thereof. For example, the abrasive particles 707 can represent conventional, crushed abrasive grit having random shapes. The abrasive particles 707 may have a median particle size less than the median particle size of the shaped abrasive particles 705.

After sufficiently forming the make coat 703 with the abrasive particulate material 710, the size coat 704 can be formed to overlie and bond the abrasive particulate material 710 in place. The size coat 704 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A particulate material comprising a body including a first phase including alumina having an average crystallite size of not greater than 5 microns, and wherein the body further comprises a second phase having a platelet shape.

Embodiment 2. A particulate material comprising a body including a first phase including alumina and a second phase having a platelet shape, wherein the second phase comprises Sr in a range of at least 0.2 wt % and not greater than 5 wt % for a total weight of the body.

Embodiment 3. A particulate material comprising a body including a first phase including alumina and a second phase having a platelet shape and containing Sr and Ce, wherein the second phase comprises a Sr content within a range of at least in a range of at least 0.2 wt % and not greater than 5 wt % for a total weight of the body, and wherein the second phase comprises a Ce content within a range of at least 0.05 wt % and not greater than 2 wt % for a total weight of the body.

Embodiment 4. A particulate material comprising a body including a first phase including alumina and a second phase having a platelet shape and containing Sr and Ce, wherein the second phase comprises a Sr and Ce, and wherein the second phase comprises a ratio of Sr:Ce within a range of at least 1:1 to not greater than 100:1.

Embodiment 5. The particulate material of any one of embodiments 1, 2, 3, and 4, wherein the platelets have a length (l) and a width (w) as viewed in two dimensions and wherein l>w.

Embodiment 6. The particulate material of embodiment 5, wherein the platelets have an average primary aspect ratio of length:width of at least 1.2:1 or at least 1.3:1 or at least 1.3:1 or at least 1.4:1 or at least 1.5:1 or at least 1.7:1 or at least 1.8:1 or at least 1.9:1 or at least 2:1 or at least 2.3:1 or at least 2.5:1 or at least 3:1 or at least 4:1 or at least 5:1 or at least 7:1 or at least 10:1.

Embodiment 7. The particulate material of embodiment 5, wherein the platelets have an average primary aspect ratio of length:width of not greater than 1000:1 or not greater than 750:1 or not greater than 500:1 or not greater than 100:1 or not greater than 50:1 or not greater than 20:1 or not greater than 10:1.

Embodiment 8. The particulate material of any one of embodiments 1, 2, 3, and 4, wherein the platelets have a length (l) and width (w) as measured in two-dimensions, and wherein the length is within a range of at least 0.2 microns to not greater than 10 microns.

Embodiment 9. The particulate material of any one of embodiments 1, 2, 3, and 4, wherein the platelets have a length (l), width (w) and wherein the width is within a range of at least 0.02 microns to not greater than 5 microns.

Embodiment 10. The particulate material of any one of embodiments 1, 2, 3, and 4, wherein the platelets are uniformly distributed throughout the body.

Embodiment 11. The particulate material of any one of embodiments 1, 2, 3, and 4, wherein the body comprises not greater than 50 platelet clusters per 500 square microns or not greater than 40 platelet clusters per 500 square microns or not greater than 30 platelet clusters per 500 square microns or not greater than 20 platelet clusters per 500 square microns or not greater than 10 platelet clusters per 500 square microns or not greater than 5 platelet clusters per 500 square microns.

Embodiment 12. The particulate material of any one of embodiments 1, 2, 3, and 4, wherein the body is essentially free of platelet clusters.

Embodiment 13. The particulate material of any one of embodiments 1, 2, 3, and 4, wherein the body comprises at least 51 wt % alumina for the total weight of the body or least 60 wt % alumina or at least 70 wt % alumina or at least 80 wt % alumina or at least 90 wt % alumina or at least 95 wt % alumina or at least 97 wt % alumina.

Embodiment 14. The particulate material of any one of embodiments 1, 2, 3, and 4, wherein the body comprises not greater than 99.9 wt % alumina for the total weight of the body or not greater than 99.5% alumina or not greater than 99 wt % alumina or not greater than 98.5 wt % alumina.

Embodiment 15. The particulate material of any one of embodiments 1, 2, 3, and 4, wherein the body comprises a theoretical density of at least 95% or at least 96% or at least 97% or at least 98% or at least 99% or at least 99.5% or at least 99.9%.

Embodiment 16. The particulate material of any one of embodiments 2, 3, and 4, wherein the first phase comprises an average crystallite size of not greater than 5 microns.

Embodiment 17. The particulate material of any one of embodiments 1 and 16, wherein the average crystallite size of the first phase is not greater than 4 microns or not greater than 3 microns or not greater than 2 microns or not greater than 1 micron or not greater than 0.9 microns or not greater than 0.8 microns or not greater than 0.7 microns or not greater than 0.6 microns or not greater than 0.5 microns or not greater than 0.4 microns.

Embodiment 18. The particulate material of any one of embodiments 1 and 16, wherein the average crystallite size of the first phase is at least 0.01 microns or at least 0.05 microns or at least 0.1 microns.

Embodiment 19. The particulate material of any one of embodiments 1, 2, 3, and 4, wherein the body comprises a seeded alumina material.

Embodiment 20. The particulate material of any one of embodiments 1 and 4, wherein the body comprises Sr in a range of at least 0.2 wt % and not greater than 5 wt % for a total weight of the body.

Embodiment 21. The particulate material of any one of embodiments 2, 3, and 20, wherein the body comprises at least 0.3 wt % Sr for a total weight of the body or at least 0.4 wt % Sr or at least 0.5 wt % or at least 0.6 wt % or at least 0.7 wt % or at least 0.8 wt % or at least 0.9 wt % or at least 1 wt % or at least 1.1 wt % or at least 1.2 wt % or at least 1.3 wt % or at least 1.4 wt % or at least 1.5 wt % or at least 1.6 wt % or at least 1.7 wt % or at least 1.8 wt % or at least 1.9 wt % or at least 2 wt % or at least 2.1 wt % or at least 2.2 wt % or at least 2.3 wt % or at least 2.4 wt % or at least 2.5 wt %.

Embodiment 22. The particulate material of any one of embodiments 2, 3, and 20, wherein the body comprises not greater than 4.9 wt % Sr for a total weight of the body or not greater than 4.8 wt % or not greater than 4.7 wt % or not greater than 4.6 wt % or not greater than 4.5 wt % or not greater than 4.4 wt % or not greater than 4.3 wt % or not greater than 4.2 wt % or not greater than 4.1 wt % or not greater than 4 wt % or not greater than 3.9 wt % or not greater than 3.8 wt % or not greater than 3.7 wt % or not greater than 3.6 wt % or not greater than 3.5 wt % or not greater than 3.4 wt % or not greater than 3.3 wt % or not greater than 3.2 wt % or not greater than 3.1 wt % or not greater than 3 wt % or not greater than 2.9 wt % or not greater than 2.8 wt % or not greater than 2.7 wt % or not greater than 2.6 wt % or not greater than 2.5 wt %.

Embodiment 23. The particulate material of any one of embodiments 1, 2, and 4, wherein the body comprises a Ce content within a range of at least 0.05 wt % and not greater than 2 wt % for a total weight of the body.

Embodiment 24. The particulate material of any one of embodiments 3 and 23, wherein the body comprises a content of Ce of at least 0.3 wt % for a total weight of the body or at least 0.4 wt % or at least 0.5 wt % or at least 0.6 wt % or at least 0.7 wt % or at least 0.8 wt % or at least 0.9 wt % or at least 1 wt % or at least 1.1 wt % or at least 1.2 wt % or at least 1.3 wt % or at least 1.5 wt %.

Embodiment 25. The particulate material of any one of embodiments 3 and 23, wherein the body comprises a content of Ce of not greater than 1.9 wt % for a total weight of the body or not greater than 1.8 wt % or not greater than 1.7 wt % or not greater than 1.6 wt % or not greater than 1.5 wt % or not greater than 1.4 wt % or not greater than 1.3 wt % or not greater than 1.2 wt % or not greater than 1.1 wt % or not greater than 1 wt % or not greater than 0.9 wt % or not greater than 0.8 wt % or not greater than 0.7 wt % or not greater than 0.6 wt % or not greater than 0.5 wt %.

Embodiment 26. The particulate material of any one of embodiments 1, 2, and 3, wherein the body comprises a Sr and Ce in a ratio of Sr:Ce within a range of at least 1:1 and not greater than 100:1.

Embodiment 27. The particulate material of any one of embodiments 4 and 26, wherein the body comprises a ratio of Sr:Ce of at least 1.5:1 or at least 1.8:1 or at least 2:1 or at least 2.5:1 or at least 3:1 or at least 3.5:1 or at least 4:1 or at least 4.5:1 or at least 5:1 or at least 6:1 or at least 8:1 or at least 10:1.

Embodiment 28. The particulate material of any one of embodiments 4 and 26, wherein the body comprises a ratio of Sr:Ce of not greater than 10:1 or not greater than 9:1 or not greater than 8:1 or not greater than 7:1 or not greater than 6:1 or not greater than 5:1 or not greater than 4:1.

Embodiment 29. The particulate material of any one of embodiments 1, 2, 3, and 4, wherein the body comprises not greater than 5 wt % of a third phase comprising Ce for a total weight of the body or not greater than 4 wt % or not greater than 3 wt % or not greater than 2 wt % or not greater than 1 wt % or not greater than 0.5 wt % or not greater than 0.1 wt %.

Embodiment 30. The particulate material of any one of embodiments 1, 2, 3, and 4, wherein the body consists essentially of the first phase and the second phase.

Embodiment 31. The particulate material of any one of embodiments 1, 2, 3, and 4, wherein the body is free of a third phase.

Embodiment 32. The particulate material of any one of embodiments 1, 2, 3, and 4, wherein the body includes at least 0.5 wt % of a third phase for a total weight of the body, wherein the third phase comprises at least one of an oxide, carbide, nitride, boride, or any combination thereof.

Embodiment 33. The particulate material of embodiment 32, wherein the third phase comprises an oxide including at least one element selected from the group consisting of Li, Na, K, Mg, Ca, Sr, Ba, Y, Zr, Ti, Mn, Fe, Nb, Mo, Hf, Ta, La, Cr, Co, Ni, Cu, Zn, or any combination thereof.

Embodiment 34. The particulate material of embodiment 32, wherein the third phase is disposed at the grain boundaries between the first and second phases.

Embodiment 35. The particulate material of embodiment 32, wherein the third phase comprises an average crystallite size that is less than the average crystallite size of the first phase.

Embodiment 36. The particulate material of embodiment 32, wherein the third phase comprises an average crystallite size that is less than the average length of the platelets of the second phase.

Embodiment 37. The particulate material of any one of embodiments 1, 2, 3, and 4, further comprising a fixed abrasive article including the particulate material.

Embodiment 38. The particulate material of embodiment 37, wherein the fixed abrasive is selected from the group consisting of a coated abrasive, a bonded abrasive, a nonwoven abrasive, an abrasive brush, or a combination thereof.

Embodiment 39. The particulate material of embodiment 37, wherein the fixed abrasive is a coated abrasive article including the particulate material arranged in a single layer overlying a substrate.

Embodiment 40. The particulate material of any one of embodiments 1, 2, 3, and 4, wherein the particulate material is a shaped abrasive particle comprising a body with a two-dimensional shape as defined by a major surface of the body from the group of shapes including polygons, irregular polygons, irregular polygons including arcuate or curved sides or portions of sides, ellipsoids, numerals, Greek alphabet characters, Latin alphabet characters, Russian alphabet characters, Kanji characters, complex shapes having a combination of polygons shapes, shapes including a central region and a plurality of arms, or any combination thereof.

Embodiment 41. The particulate material of any one of embodiments 1, 2, 3, and 4, wherein the particulate material is a controlled thickness abrasive particle having a body of a substantially uniform thickness and an irregular two dimensional shape when viewed in the plane defined by the length and width of the body.

EXAMPLE 1

Five different samples were made with various compositions as provided in Table 1 below. These five samples (S1, S2, S3, S4 and S5) were prepared from a gel including 41.5 wt % boehmite, which is commercially available as Catapal B, and seeded with 1% alpha alumina seeds and dopants in the weight percentages as provided in Table 1.

The mixture also included 55 wt % water and 2.5 wt % nitric acid. The mixture was extruded into equilateral triangular shaped openings in a production tool, wherein the triangular shaped openings had a length (side of triangle) of 2.77 mm, a width of 2.4 mm and a depth (height) of 0.53 mm. The production tool was made of metal. The surfaces of the openings in the production tool were coated with a lubricant of olive oil to facilitate removal of the precursor shaped abrasive particles from the production tool. The mixture was dried in the openings at approximately 50° C. for 10 minutes. The mixture was then removed from the openings of the production tool.

The dried particles were then calcined at a calcination temperature of approximately 1000° C. for 10 minutes in a rotary tube furnace of standard atmospheric pressure and an atmosphere of air. The calcined particulate material was made primarily of transition phase alumina. The pore volume was measured using BET to determine saturation and over-saturation conditions for the calcined particles.

TABLE 1

|  | Sample S1 | Sample S2 | Sample S3 | Sample S4 | Sample S5 |
| --- | --- | --- | --- | --- | --- |
| Target Composition | 0.5 wt % $CeO_2$ 2 wt % SrO | 0.5 wt % $CeO_2$ 5 wt % SrO | 2 wt % $CeO_2$ 2 wt % SrO | 0.5 wt % $CeO_2$ 0.1 wt % SrO | 0 wt % $CeO_2$ 2 wt % SrO |
| Mass calcined grains (g) | 195 | 189 | 192 | 199 | 196 |
| Mass Ce(NO3)3•6H2O (g) | 2.52 | 2.52 | 10.1 | 2.52 | 0 |
| Mass Sr(NO3)2 (g) | 8.17 | 20.42 | 8.17 | 0.41 | 8.17 |
| Mass DI water (g) | 114 | 107 | 110 | 119 | 116 |

For each sample, an additive solution was created using the contents of cerium nitrate, strontium nitrate and deionized water as provided in Table 1. The additive solution was mixed until the salts were completely dissolved. The calcined particles were placed in a beaker and rotated to stir the calcined particles. The entire additive solution was sprayed as a mist into the beaker while the calcined particles were mixing to impregnate the calcined particles with the additive solution. After impregnation, the impregnated powder was dried for approximately 12-15 hours in an oven set at 80° C. The impregnated particles were sintered in a Lindberg rotary furnace operating at 8 rpms and set at a temperature of 1430° C. for approximately 3 minutes. The resulting shaped abrasive particles were generally in the shape of equilateral triangles as viewed top down on the major surfaces, and had a length (along a side) of approximately 1650 microns and a height of approximately 300 microns.

SEM images of each of the Samples S1-S5 are provided in FIGS. 8-12, respectively. Inductively coupled plasma (ICP) analysis was completed on each sample to measure the composition of the secondary phase according to the following method. The results of the ICP analysis are provided in Table 2. The ICP measurements were completed using known techniques.

TABLE 2

|     |          | S1   | S2   | S3   | S4   | S5  |
|-----|----------|------|------|------|------|-----|
| ICP | wt % SrO | 1.8  | 4.8  | 1.82 | 0.11 | 1.9 |
|     | wt % CeO$_2$ | 0.44 | 0.48 | 1.9  | 0.49 | 0.0 |

Notably, Sample S1 demonstrated a uniform distribution of platelets of the second phase. Sample 2 had a significant number of platelet clusters. FIGS. 2C and 2D are representative of the microstructure of Sample S2. Sample S3 demonstrated a significant portion of a third phase, which was not readily apparent in the other samples. The microstructure of Sample S4 did not include a second phase having platelets. Sample S5 appeared to have a second phase including platelets, but also a first phase having a significantly larger average crystal size compared to the first phase of Sample S1.

The grinding performance of the shaped abrasive particles of Samples S1-S5 was evaluated according to a standardized single-grit grinding test (SGGT). In conducting the SGGT, one single shaped abrasive particle was held in a grit holder by a bonding material of epoxy. The shaped abrasive particle was secured in the desired orientation (i.e., major surface orientation or side surface orientation) and moved across a workpiece of 304 stainless steel for a scratch length of 8 inches, at a wheel speed of 22 m/s, and an initial scratch depth of 30 microns. The shaped abrasive particles were mounted such that the tips of the triangles were pointing up and configured to strike the workpiece first. The shaped abrasive particle produced a groove in the workpiece having a cross-sectional area (AR). For each sample set, each shaped abrasive particle completed 15 passes across the 8 inch length, 10 individual particles were tested for each of the orientations and the results were analyzed. The test measured the tangential force exerted by the grit on the workpiece, in the direction that is parallel to the surface of the workpiece and the direction of the groove, and the net change in the cross-sectional area of the groove from beginning to the end of the scratch length was measured to determine the shaped abrasive particle wear. The net change in the cross-sectional area of the groove for each pass was measured. For the SGGT, a minimum threshold value of at least 1000 microns$^2$ for the cross-sectional area of the groove was set for each pass. If the particle failed to form a groove having the minimum threshold cross-sectional area, the data was not recorded for that pass.

The SGGT was conducted using two different orientations of the shaped abrasive particles relative to the workpiece. For each of the samples, the SGGT was conducted with a first sample set of shaped abrasive particles in a major surface orientation, wherein a major surface of each shaped abrasive particle was oriented perpendicular to the grinding direction such that the major surface initiated grinding on the workpiece. A second sample set of shaped abrasive particles were oriented in a side surface orientation, wherein a side surface of each shaped abrasive particle was oriented perpendicular to the direction of grinding and was the leading surface during grinding.

Figure 13:
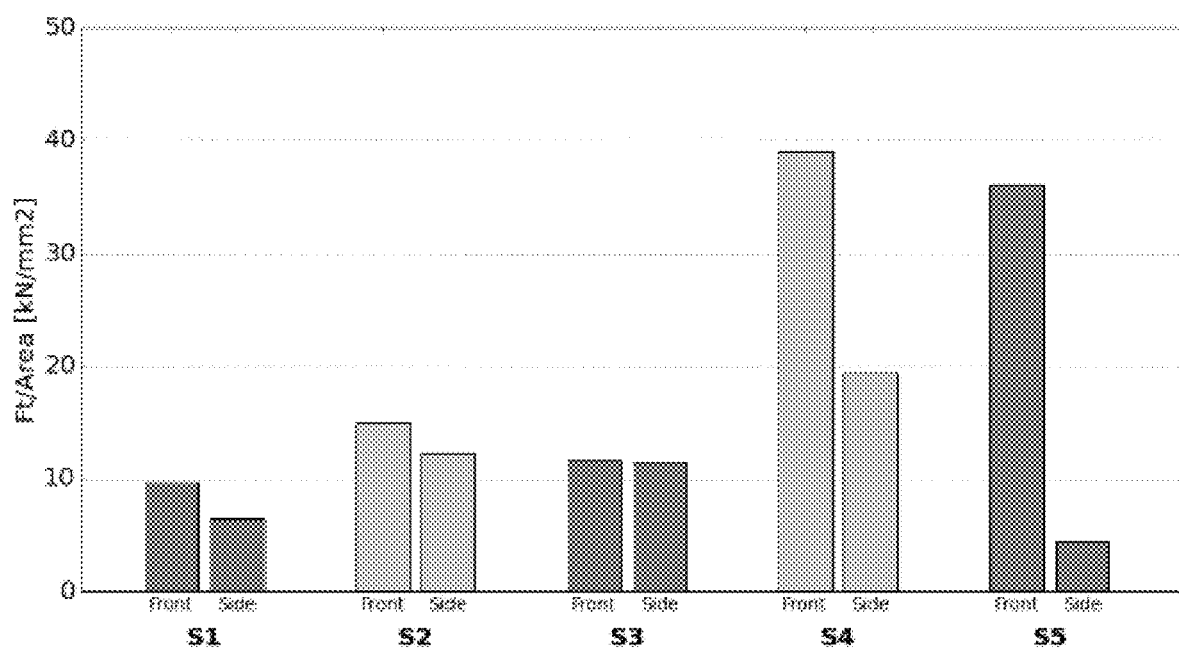
FIG. 13 includes a plot of major surface grinding efficiency and side surface grinding efficiency according to the SGGT for samples formed according to the examples.

FIG. 13 includes a plot of force per area derived from the SGGT for each of the Samples S1-S5 in the front orientation (i.e., major surface orientation) and side surface orientation. As illustrated, Sample S1 demonstrated the lowest total force per area for the front and side orientations compared to the Samples S2-S5. The lower the total force per area, the more efficient the cutting or grinding action by the abrasive particle.

The present application represents a departure from the state of the art. While the industry has recognized that alumina materials may have certain additives, the effect of certain combinations of additives, the phases created by such additives, and the microstructures created by controlled contents of such additives continues to be an area of significant research. The particulate material of the embodiments herein can be formed through particular processes and results in particular microstructures, which may facilitate improved performance of the particulate material, especially as an abrasive material.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A particulate material comprising a body including a first phase including alumina having an average crystallite size of not greater than 5 microns, wherein the body further comprises a second phase having a platelet shape, wherein the second phase consists of Strontium (Sr) and Cerium (Ce) and wherein the body comprises a ratio of Sr:Ce of at least 1:1.

2. The particulate material of claim 1, wherein the platelets have a length (l) and a width (w) as viewed in two dimensions and wherein l>w.

3. The particulate material of claim 2, wherein the platelets have an average primary aspect ratio of length:width of at least 2:1 and not greater than 1000:1.

4. The particulate material of claim 1, wherein the platelets are uniformly distributed throughout the body.

5. The particulate material of claim 1, wherein the body comprises not greater than 50 platelet clusters per 500 square microns.

6. The particulate material of claim 1, wherein the body comprises at least 90 wt % and not greater than 99 wt % alumina for the total weight of the body.

7. The particulate material of claim 1, wherein the body comprises Sr in a range of at least 0.2 wt % and not greater than 5 wt % for a total weight of the body.

8. The particulate material of claim 1, wherein the body comprises a Ce content within a range of at least 0.05 wt % and not greater than 2 wt % for a total weight of the body.

9. The particulate material of claim 1, wherein the body comprises Sr and Ce in a ratio of Sr:Ce of not greater than 100:1.

10. The particulate material of claim 1, wherein the body consists essentially of the first phase and the second phase.

11. The particulate material of claim 1, wherein the body is free of a third phase.

12. The particulate material of claim 1, wherein the body includes at least 0.5 wt % of a third phase for a total weight of the body, wherein the third phase comprises at least one of an oxide, carbide, nitride, boride, or any combination thereof.

13. The particulate material of claim 1, wherein further comprising a fixed abrasive article including the particulate material.

14. The particulate material of claim 13, wherein the fixed abrasive is selected from the group consisting of a coated abrasive, a bonded abrasive, a non-woven abrasive, an abrasive brush, or a combination thereof.

15. The particulate material of claim 13, wherein the fixed abrasive is a coated abrasive article including the particulate material arranged in a single layer overlying a substrate.

16. The particulate material of claim 1, wherein the particulate material is a shaped abrasive particle comprising a body with a two-dimensional shape as defined by a major surface of the body from the group of shapes including polygons, irregular polygons, irregular polygons including arcuate or curved sides or portions of sides, ellipsoids, numerals, Greek alphabet characters, Latin alphabet characters, Russian alphabet characters, Kanji characters, complex shapes having a combination of polygons shapes, shapes including a central region and a plurality of arms, or any combination thereof.

17. The particulate material of claim 1, wherein the particulate material is a controlled thickness abrasive particle having a body of a uniform thickness and an irregular two dimensional shape when viewed in the plane defined by the length and width of the body.

18. A particulate material comprising a body including a first phase including alumina and a second phase having a platelet shape, wherein the second phase consists of Strontium (Sr) and Cerium (Ce), wherein the second phase comprises Sr in a range of at least 0.2 wt % and not greater than 5 wt % for a total weight of the body and wherein the body comprises a ratio of Sr:Ce of at least 1:1.

19. The particulate material of claim 18, wherein the second phase comprises a Sr content within a range of at least in a range of at least 1 wt % and not greater than 3 wt % for a total weight of the body, and wherein the second phase comprises a Ce content within a range of at least 0.05 wt % and not greater than 2 wt % for a total weight of the body.

20. The particulate material of claim 19, wherein the body comprises not greater than 50 platelet clusters per 500 square microns and further wherein the body comprises at least 90 wt % and not greater than 99 wt % alumina for the total weight of the body.

* * * * *